(12) United States Patent
Hashiguchi et al.

(10) Patent No.: US 10,782,579 B2
(45) Date of Patent: Sep. 22, 2020

(54) LIQUID CRYSTAL DISPLAY PANEL

(71) Applicant: Mitsubishi Electric Corporation, Tokyo (JP)

(72) Inventors: Takafumi Hashiguchi, Tokyo (JP); Naoya Hirata, Tokyo (JP); Tatsuya Baba, Tokyo (JP); Manabu Tanahara, Tokyo (JP); Naruhito Hoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/432,193

(22) Filed: Jun. 5, 2019

(65) Prior Publication Data

US 2019/0384132 A1    Dec. 19, 2019

(30) Foreign Application Priority Data

Jun. 14, 2018 (JP) ................. 2018-113221

(51) Int. Cl.

| G02F 1/136 | (2006.01) |
|---|---|
| G02F 1/1362 | (2006.01) |
| G02F 1/1335 | (2006.01) |
| G02F 1/1343 | (2006.01) |
| G02F 1/1333 | (2006.01) |
| G02F 1/1345 | (2006.01) |

(52) U.S. Cl.
CPC ...... *G02F 1/136286* (2013.01); *G02F 1/1343* (2013.01); *G02F 1/133345* (2013.01); *G02F 1/133512* (2013.01); *G02F 1/1345* (2013.01); *G02F 2001/13606* (2013.01); *G02F 2001/134372* (2013.01); *G09G 2300/0426* (2013.01)

(58) Field of Classification Search
None
See application file for complete search history.

(56) References Cited

U.S. PATENT DOCUMENTS

| 2016/0020224 A1 | 1/2016 | Kawamura et al. |
|---|---|---|
| 2018/0130828 A1* | 5/2018 | Lee .................. H01L 29/78648 |
| 2018/0151594 A1 | 5/2018 | Kawamura et al. |
| 2018/0246386 A1 | 8/2018 | Hashiguchi et al. |

FOREIGN PATENT DOCUMENTS

| JP | 2018-138961 A | 9/2018 |
|---|---|---|
| WO | 2014/155458 A1 | 10/2014 |

* cited by examiner

*Primary Examiner* — Richard H Kim
(74) *Attorney, Agent, or Firm* — Studebaker & Brackett PC

(57) ABSTRACT

First and second gate lines respectively extend in first and second directions in a display area. The second gate line is electrically connected to the first gate line and extends in the second direction in the display area. The second gate line is electrically connected to the first gate line outside the display area. A conductive layer may be disposed between the second gate line and a source line, and the second gate line may be electrically connected to the first gate line in the display area. To the conductive layer, a potential identical to a common potential or a ground potential is applied. An arrangement where two or more second gate lines overlap the source line may be employed. Transition of a potential of a gate signal from an on potential to an off potential may be made in two or more stages.

10 Claims, 14 Drawing Sheets

F I G. 1
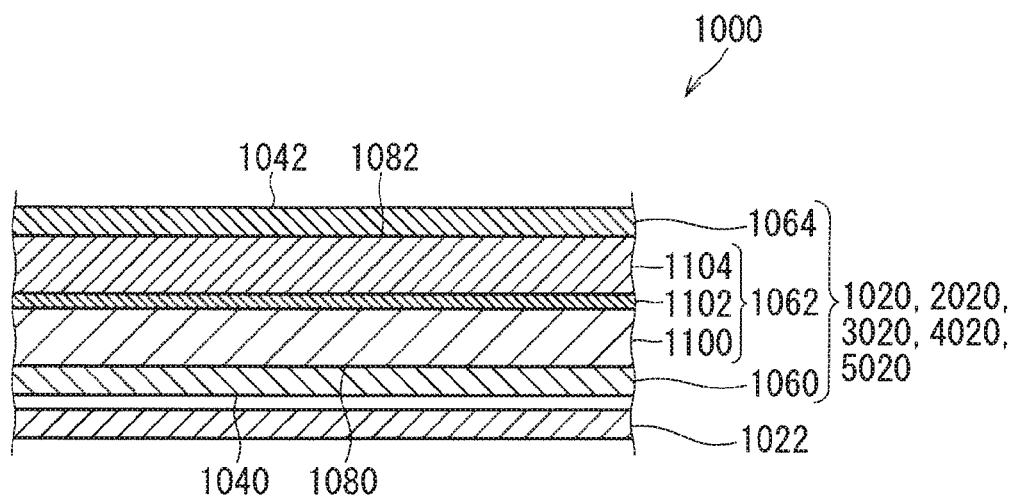

F I G. 5
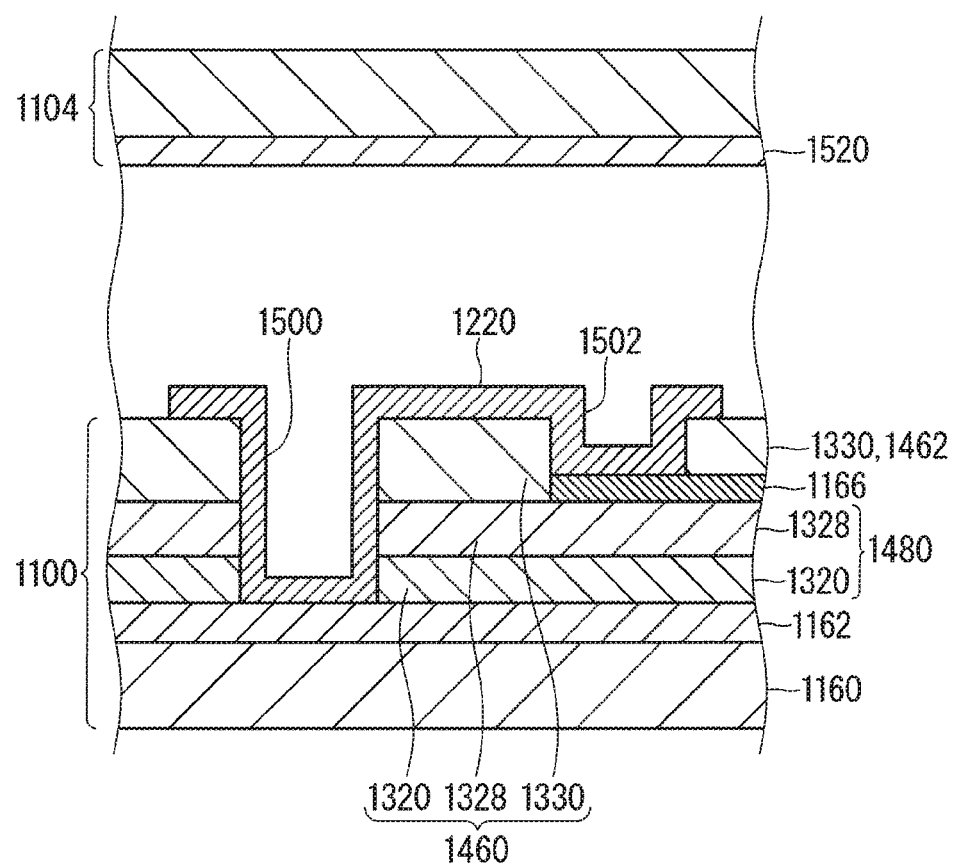

LIQUID CRYSTAL DISPLAY PANEL

BACKGROUND OF THE INVENTION

Field of the Invention

The present invention relates to a liquid crystal display panel.

Description of the Background Art

In the past, cathode ray tube display devices were widely used, but at present, new display devices in place of the cathode ray tube display devices have been widely used. Many of such new display devices are provided with lightweight, flat display panels and accordingly have a feature of being lightweight and thin.

Examples of such new display devices include a liquid crystal display device, an electroluminescent display device, and the like. The liquid crystal display device displays an image using physical properties of liquid crystals. The electroluminescent display device displays an image using the principle of electroluminescence. The liquid crystal display device, a typical example of the new display device, has a feature of being low-voltage driven in addition to the feature of being lightweight and thin.

The liquid crystal display device includes an array substrate, a liquid crystal layer, and a counter substrate. The array substrate and the counter substrate face each other with the liquid crystal layer interposed therebetween. The array substrate includes a plurality of pixels. The plurality of pixels are arranged in a matrix to define a display area in which an image is displayed.

Examples of the liquid crystal display device include a thin film transistor (TFT) liquid crystal display device. In such a TFT liquid crystal display device, each pixel includes a TFT serving as a switching element, and holds a voltage for driving a liquid crystal layer independently from other pixels. Accordingly, the TFT liquid crystal display device has a feature of being capable of displaying a high-quality image without large crosstalk.

The TFT liquid crystal display device has a large number of gate lines and a large number of source lines. The gate lines are also referred to as scan lines and transmit a gate signal to the TFT. The source lines are also referred to as signal lines and transmit a source signal to the TFT. Switching control of the TFT between an on state and an off state is performed in accordance with the gate signal. Image data is supplied to the TFT through the source signal. Each pixel is usually disposed in a region surrounded by two adjacent gate lines and two adjacent source lines.

Recently, a fringe field switching (FFS) mode that can realize a TFT liquid crystal display device having excellent viewing angle characteristics and high light transmittance has been proposed. The following description will be given by taking the FFS mode as an example.

In an FFS liquid crystal display device, when an image is displayed, a fringe electric field constituted by an oblique electric field having both transverse and longitudinal electric field components is applied to a liquid crystal layer. In the FFS liquid crystal display device, in order to apply the fringe electric field to the liquid crystal layer, the array substrate includes a pixel electrode, a common electrode, and an insulating film. The pixel electrode and the common electrode face each other with the insulating film interposed therebetween, and are disposed apart from each other in the thickness direction of the array substrate. In general, a lower layer electrode disposed below the insulating film has a plate-like shape, and an upper layer electrode disposed above the insulating film includes a plurality of gaps. Each of the gaps has a slit. The plurality of gaps overlap the upper layer electrode in plan view in the thickness direction of the array substrate. The lower electrode may have a plurality of rod-shaped bodies. In the FFS liquid crystal display device, orientations of liquid crystal molecules contained in the liquid crystal layer are controlled by an electric field from the lower layer electrode to the upper layer electrode through the slit. In the FFS liquid crystal display device, the pixel electrode and the common electrode are each made of a transparent conductive film to become a transparent pixel electrode and a transparent common electrode, respectively, which makes it possible to achieve high light transmittance.

Such an FFS liquid crystal display device having excellent viewing angle characteristics and high light transmittance is used in various applications. Therefore, for the FFS liquid crystal display device, great importance has been attached to product design, and narrowing the frame area around the display area has been strongly required.

On the other hand, the gate line and the source line are disposed in the display area and are orthogonal to each other in the display area. Further, the array substrate has, around the display area, an area where a driver integrated circuit (IC) that outputs the gate signal and the source signal is mounted, and an area where routing lines that respectively transmit the gate signal and the source signal output from the driver IC to the gate line and the source line are formed. Accordingly, the array substrate has an area where the driver IC is mounted along at least two of the four sides surrounding the display area. Therefore, in the FFS liquid crystal display device, it is difficult to narrow the frame area defined along three of the four sides surrounding the display area.

Therefore, proposed is a technique to dispose a routing line that extends in a direction parallel to a direction in which the source line extends and transmits the gate signal to the gate line in the display area and define the area where the driver IC is mounted along only one of the four sides surrounding the display area, thereby narrowing the frame area defined along three sides other than the one side. The technology described in WO 2014/155458 A is an example of the proposal.

However, when the routing line that transmits the gate signal to the gate line is disposed in the display area, the routing line is disposed along the source line and capacitively coupled to the source line. This causes a potential of the source signal transmitted through the source line to vary due to the gate signal transmitted through the routing line. For example, when the TFT is switched from the on state to the off state, the potential of the gate signal varies from a high potential to a low potential, so that the potential of the source signal also varies with the variation in the potential of the gate signal.

In a non-selection time in which the pixel electrode is not selected and the source signal is not transmitted to the pixel electrode, display abnormality does not occur even when the potential of the source signal varies. However, in a selection time in which the pixel electrode is selected and the source signal is transmitted to the pixel electrode, when the potential of the source signal varies, the potential of the source signal written to the pixel electrode varies, the pixel potential applied to the pixel electrode varies, and then display abnormality occurs. In particular, in a case where the routing line is electrically connected to the gate line through a through hole, the pixel in the vicinity of the through hole is easily affected by the variation in the potential of the source signal, and accordingly point defect failure occurs in the pixel.

SUMMARY

An object of the present invention is to provide a liquid crystal display panel capable of narrowing a frame area defined along three of four sides surrounding a display area and suppressing display abnormality.

First to fourth aspects of the present invention relate to a liquid crystal display panel.

The liquid crystal display panel includes an array substrate, a liquid crystal layer, and a counter substrate. The counter substrate faces the array substrate with the liquid crystal layer interposed therebetween.

The array substrate includes an insulating substrate, a plurality of first gate lines, a plurality of source lines, a plurality of switching elements, a plurality of transparent pixel electrodes, and a plurality of second gate lines. The plurality of first gate lines, the plurality of source lines, the plurality of switching elements, the plurality of transparent pixel electrodes, and the plurality of second gate lines are disposed above the insulating substrate.

The plurality of first gate lines extend in a first direction parallel to the insulating substrate in a display area where an image is displayed, and respectively transmit a plurality of gate signals.

The plurality of source lines extend in a second direction that is parallel to the insulating substrate and orthogonal to the first direction in the display area, form a plurality of intersections with the plurality of first gate lines in plan view in a thickness direction of the insulating substrate, and respectively transmit a plurality of source signals.

The plurality of switching elements respectively switch source signals transmitted through source lines that form the plurality of intersections in accordance with gate signals transmitted through gate lines that form the plurality of intersections to produce a plurality of pixel potentials.

The plurality of transparent pixel electrodes are disposed in the display area. To the plurality of transparent pixel electrodes, the plurality of pixel potentials are respectively applied.

The plurality of second gate lines extend in the second direction in the display, area, and are disposed at positions different from positions where the plurality of first gate lines are disposed in the thickness direction of the insulating substrate. The plurality of second gate lines are electrically connected to the plurality of first gate lines respectively and respectively transmit the plurality of gate signals to the plurality of first gate lines.

In the first aspect of the present invention, the array substrate further includes a common electrode. The common electrode produces electric fields in response to the plurality of pixel potentials respectively between the plurality of transparent pixel electrodes and the common electrode. Further, the plurality of second gate lines are electrically connected to the plurality of first gate lines outside the display area respectively.

The plurality of gate signals and the plurality of source signals can be supplied from one side in the second direction when viewed from the display area. Further, it is possible to prevent the plurality of second gate lines from being disposed on one side in the first direction, the other side in the first direction, and the other side in the second direction when viewed from the display area. This in turn makes it possible to narrow the frame area defined along three of the four sides surrounding the display area.

Further, the electrical connection of the second gate line to the first gate line that makes an influence of the gate signal on the source signal significant is made outside the display area. This in turn makes it possible to suppress display abnormality.

In the second aspect of the present invention, the plurality of second gate lines are electrically connected to the plurality of first gate lines in the display area respectively. The array substrate further includes a transparent common electrode and a plurality of conductive layers. The transparent common electrode is disposed above the insulating substrate, and produces fringe electric fields in response to the plurality of pixel potentials respectively between the plurality of transparent pixel electrodes and the transparent common electrode. The plurality of conductive layers are respectively disposed between the plurality of source lines and the plurality of second gate lines. To the plurality of conductive layers, a potential identical to a common potential applied to the transparent common electrode or a ground potential is applied.

The plurality of gate signals and the plurality of source signals can be supplied from one side in the second direction when viewed from the display area. Further, it is possible to prevent the plurality of second gate lines from being disposed on one side in the first direction, the other side in the first direction, and the other side in the second direction when viewed from the display area. This in turn makes it possible to narrow the frame area defined along three of the four sides surrounding the display area.

Further, stray capacitances produced between the plurality of source lines and the plurality of second gate lines are reduced, making it possible to suppress the influence of the gate signals on the source signals. This in turn makes it possible to suppress display abnormality.

In the third aspect of the present invention, the array substrate further includes a common electrode. The common electrode produces electric fields in response to plurality of pixel potentials respectively between the plurality of transparent pixel electrodes and the common electrode. Further, the plurality of second gate lines have an arrangement where two or more second gates lines overlap each of the plurality of source lines in the display area in plan view in the thickness direction of the insulating substrate.

The plurality of gate signals and the plurality of source signals can be supplied from one side in the second direction when viewed from the display area. Further, it is possible to prevent the plurality of second gate lines from being disposed on one side in the first direction, the other side in the first direction, and the other side in the second direction when viewed from the display area. This in turn makes it possible to narrow the frame area defined along three of the four sides surrounding the display area.

Two or more second gate lines are capacitively coupled to one source line to make the stray capacitance produced between one second gate line and one source line small, making it possible to suppress the influence of the gate signal on the source signal. This in turn makes it possible to suppress display abnormality.

In the fourth aspect of the present invention, the liquid crystal display panel further includes a gate signal source. The gate signal source outputs the plurality of gate signals and makes transition of a potential of each of the plurality of gate signals from an on potential to an off potential in two or more stages.

The plurality of gate signals and the plurality of source signals can be supplied from one side in the second direction when viewed from the display area. Further, it is possible to prevent the plurality of second gate lines from being disposed on one side in the first direction, the other side in the first direction, and the other side in the second direction when viewed from the display area. This in turn makes it possible to narrow the frame area defined along three of the four sides surrounding the display area.

The transition of the gate signal from the on potential to the off potential is made slowly, making it possible to suppress the influence of the gate signal on the source signal. This in turn makes it possible to suppress display abnormality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a cross-sectional view schematically illustrating a liquid crystal display device including a liquid crystal display panel of first to fifth preferred embodiments;

FIG. 5 is an enlarged cross-sectional view schematically illustrating the array substrate and a counter substrate provided in the liquid crystal display panel of the first, third, fourth, and fifth preferred embodiments;

DESCRIPTION OF THE PREFERRED EMBODIMENTS

Figure 2:
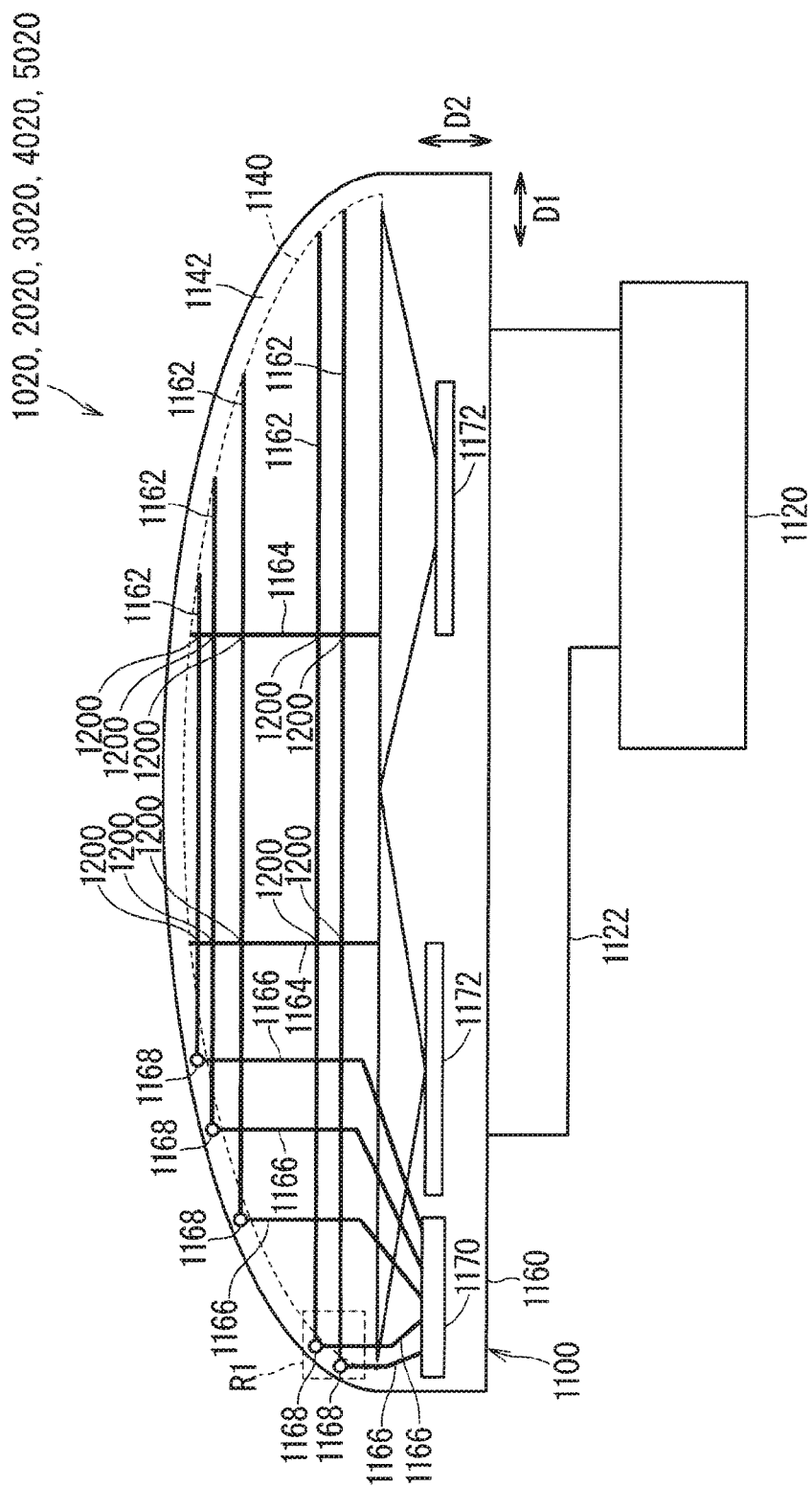
FIG. 2 is a plan view schematically illustrating the liquid crystal display panel of the first, second, fourth, and fifth preferred embodiments.

1 First Preferred Embodiment 1.1 Cross-Sectional Structure of Liquid Crystal Display Device FIG. 1 is a cross-sectional view schematically showing a liquid crystal display device including a liquid crystal display panel of the first preferred embodiment.

A liquid crystal display device 1000 illustrated in FIG. 1 includes a liquid crystal display panel 1020 and a backlight 1022. The liquid crystal display device 1000 may include components other than these components.

The liquid crystal display device 1000 is a transmissive liquid crystal display device. The following technology may be applied to a reflective or semi-transmissive liquid crystal display device.

The backlight 1022 emits light and causes the light thus emitted to impinge on a main surface 1040 on a back side of the liquid crystal display panel 1020.

The liquid crystal display panel 1020 transmits the light that has impinged on the main surface 1040 on the back side of the liquid crystal display panel 1020, and causes the light thus transmitted to exit from a main surface 1042 on a display surface side of the liquid crystal display panel 1020. When transmitting the light, the liquid crystal display panel 1020 controls a pixel potential applied to each pixel in accordance with an electric signal input to the liquid crystal display panel 1020 to control light transmittance of each pixel in accordance with the pixel potential applied to each pixel.

This causes an image corresponding to the electric signal input to the liquid crystal display panel 1020 to be displayed on the main surface 1042 on the display surface side of the liquid crystal display panel 1020.

1.2 Cross-Sectional Structure of Liquid Crystal Display Panel

The liquid crystal display panel 1020 illustrated in FIG. 1 is a liquid crystal display panel of a fringe field switching (FFS) type.

The liquid crystal display panel 1020 includes, as illustrated in FIG. 1, a first polarizing plate 1060, a liquid crystal cell 1062, and a second polarizing plate 1064. The liquid crystal display panel 1020 may include components other than these components.

The first polarizing plate 1060 selectively transmits light having a first polarization direction contained in the light that has impinged on the main surface 1040 on the back side of the liquid crystal display panel 1020 and causes the light thus transmitted to impinge on a main surface 1080 on a back side of the liquid crystal cell 1062.

The liquid crystal cell 1062 transmits the light that has impinged on the main surface 1080 on the back side of the liquid crystal cell 1062 and causes the light thus transmitted to exit from a main surface 1082 on a display surface side of the liquid crystal cell 1062. When transmitting light, the liquid crystal cell 1062 controls an amount of change in polarization direction in each pixel in accordance with the pixel potential applied to the pixel.

The second polarizing plate 1064 selectively transmits light having a second polarization direction contained in the light that has exited from the main surface 1082 on the display surface side of the liquid crystal cell 1062 and causes the light thus transmitted to exit from the main surface 1042 on the display surface side of the liquid crystal display panel 1020.

This causes the light transmittance of each pixel to be controlled in accordance with the pixel potential applied to the pixel.

1.3 Cross-Sectional Structure of Liquid Crystal Cell

The liquid crystal cell 1062 includes, as illustrated in FIG. 1, an array substrate 1100, a liquid crystal layer 1102, and a counter substrate 1104. The liquid crystal cell 1062 may include components other than these components.

The counter substrate 1104 faces the array substrate 1100 with the liquid crystal layer 1102 interposed therebetween. The liquid crystal layer 1102 is sealed in between the array substrate 1100 and the counter substrate 1104. A color filter may be formed on the counter substrate 1104.

The liquid crystal cell 1062 controls an electric field applied to the liquid crystal layer 1102 in each pixel in accordance with the pixel potential applied to the pixel, controls orientations of liquid crystal molecules contained in the liquid crystal layer 1102 in the pixel in accordance with the electric field thus applied to control the amount of change in polarization direction in the pixel using the orientations of liquid crystal molecules. This causes the amount of change in polarization direction in each pixel to be controlled in accordance with the pixel potential applied to the pixel.

1.4 Planar Structure of Array Substrate

FIG. 2 is a plan view schematically showing the liquid crystal display panel of the first preferred embodiment.

As illustrated in FIG. 2, the liquid crystal display panel 1020 includes the array substrate 1100 described above, and further includes a circuit board 1120 and a flexible circuit board 1122.

The liquid crystal display panel 1020 has a peculiar planar shape. The liquid crystal display panel 1020 may have a rectangular planar shape.

The liquid crystal display panel 1020 has a display area 1140 where an image is displayed. The liquid crystal display panel 1020 further has a frame area 1142 defined along three of four sides surrounding the display area 1140.

The array substrate 1100 is a thin film transistor (TFT) array substrate. The array substrate 1100 includes an insulating substrate 1160, a plurality of first gate lines 1162, a plurality of source lines 1164, a plurality of second gate lines 1166, a plurality of contact parts 1168, a gate driver integrated circuit (IC) 1170 and a source driver IC 1172.

A first direction D1 is a horizontal direction parallel to the insulating substrate 1160. A second direction D2 is a vertical direction parallel to the insulating substrate 1160. Therefore, the second direction D2 is orthogonal to the first direction D1.

The plurality of first gate lines 1162, the plurality of source lines 1164, the plurality of second gate lines 1166, the plurality of contact parts 1168, the gate driver IC 1170, and the source driver IC 1172 are disposed above the insulating substrate 1160.

Main portions of the plurality of first gate lines 1162 are disposed in the display area 1140. The plurality of first gate lines 1162 extend in the first direction D1 in the display area 1140 and are arranged in the second direction D2.

Main portions of the plurality of source lines 1164 are disposed in the display area 1140. The plurality of source lines 1164 extend in the second direction D2 in the display area 1140 and are arranged in the first direction D1. This causes the plurality of source lines 1164 and the plurality of first gate lines 1162 to form a plurality of intersections 1200 in plan view in a thickness direction of the insulating substrate 1160.

Main portions of the Plurality of second gate lines 1166 are disposed in the display area 1140. The plurality of second gate lines 1166 extend in the second direction D2 in the display area 1140 and are arranged in the first direction D1. The plurality of second gate lines 1166 are electrically connected to the plurality of first gate lines 1162 through the plurality of contact parts 1168 respectively. The plurality of contact parts 1168 are disposed outside the display area 1140. This causes the plurality of second gate lines 1166 to be electrically connected to the plurality of first gate lines 1162 outside the display area 1140 respectively.

The gate driver IC 1170 is a gate signal source that outputs a plurality of gate signals. The plurality of second gate lines 1166 respectively transmit the plurality of gate signals thus output to the plurality of first gate lines 1162. The plurality of first gate lines 1162 respectively transmit the plurality of gate signals thus transmitted.

The source driver IC 1172 is a source signal source that outputs a plurality of source signals. The plurality of source lines 1164 respectively transmit the plurality of source signals thus output.

The circuit board 1120 is electrically connected to the array substrate 1100 through the flexible circuit board 1122.

In the first preferred embodiment, the plurality of gate signals and the plurality, of source signals can be supplied from one side in the second direction D2 when viewed from the display area 1140. This allows the gate driver IC 1170 and the source driver IC 1172 to be disposed only on one side in the second direction D2 when viewed from the display area 1140. It is also possible to prevent the plurality of second gate lines 1166 from being disposed on one side in the first direction D1, the other side in the first direction D1, and the other side in the second direction D2 when viewed from the display area 1140. This in turn makes it possible to narrow the frame area 1142 defined along three of the four sides surrounding the display area 1140.

Further, in the first preferred embodiment, even when a resolution of the liquid crystal display panel 1020 is increased and accordingly the number of the plurality of first gate lines 1162 and the number of the plurality of second gate lines 1166 are increased, the frame area 1142 can be narrowed.

In the first preferred embodiment, the electrical connection of the second gate line 1166 to the first gate line 1162 that increases an influence of the gate signal on the source signal caused by a parasitic capacitance produced between the second gate line 1166 and the source line 1164 is made outside the display area 1140. This makes it possible to suppress display abnormality and point defect failure.

In the first preferred embodiment, a degree of freedom in the shapes of three of the four sides surrounding the display area 1140 is increased. This makes it possible to easily design the liquid crystal display panel 1020 having a peculiar planar shape and high design characteristics.

1.5 Pattern on Array Substrate

Figure 3:
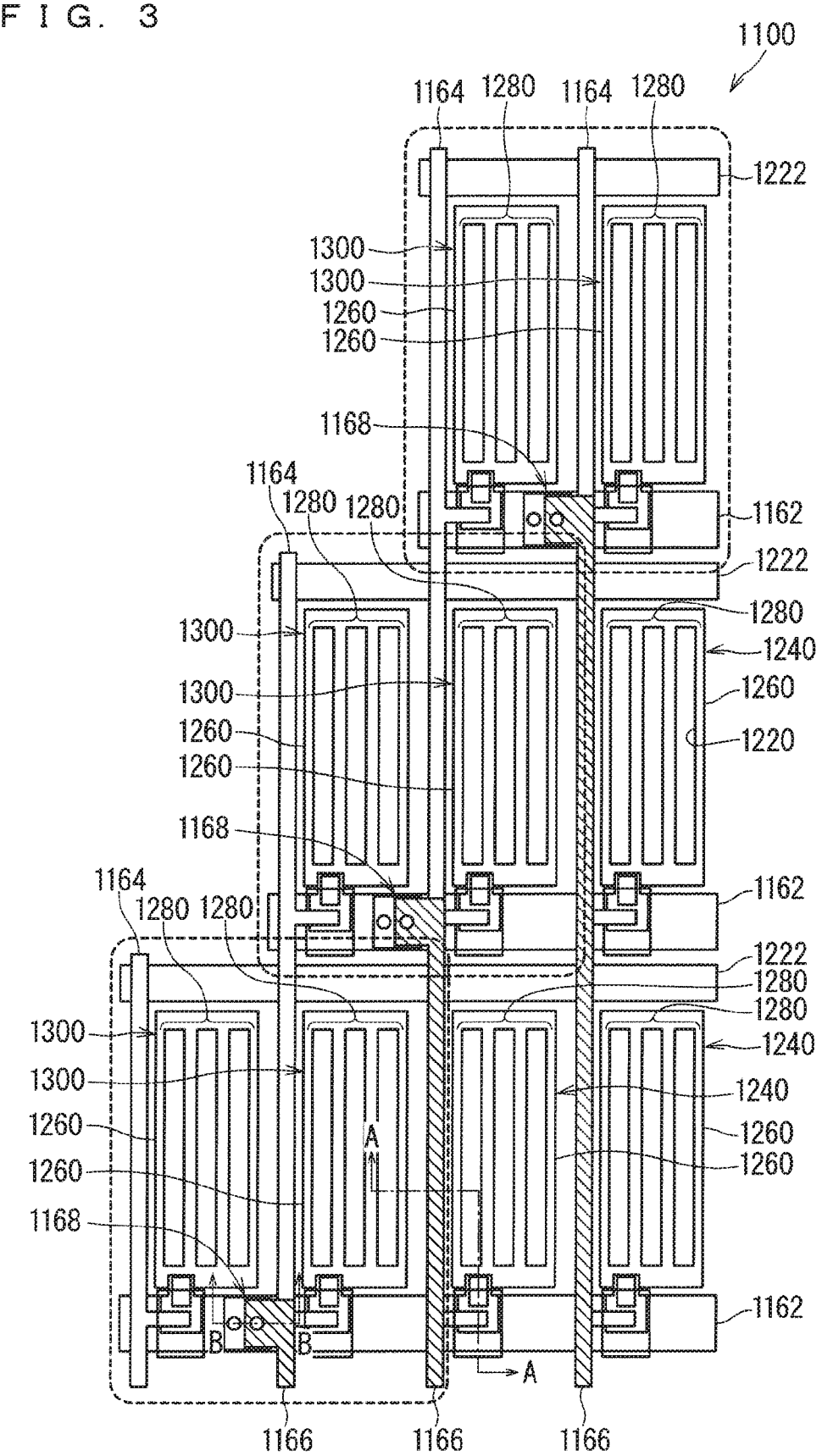
FIG. 3 is an enlarged plan view schematically illustrating a pattern on an array substrate provided in the liquid crystal display panel of the first and fifth preferred embodiments.

FIG. 3 is an enlarged plan view schematically illustrating a pattern on the array substrate provided in the liquid crystal display panel of the first preferred embodiment. FIG. 3 is an enlarged view of a pattern located in a region R1 illustrated in FIG.

The array substrate 1100 includes, as illustrated in FIG. 3, the plurality of first gate lines 1162, the plurality of source lines 1164, and the plurality of second gate lines 1166 described above, and further includes a transparent common electrode 1220 and a plurality of auxiliary capacitance (CS) lines 1222.

The plurality of second gate lines 1166 extend along the plurality of source lines 1164 in the display area 1140 and overlap the plurality of source lines 1164 in the display area 1140 in plan view in the thickness direction of the insulating substrate 1160.

The transparent common electrode 1220 is disposed above the insulating substrate 1160, and disposed in the display area 1140.

The array substrate 1100 includes a plurality of pixels 1240. The plurality of pixels 1240 contributes to the display of an image, and are arranged in a matrix within the display area 1140. Each of the plurality of pixels 1240 includes a transparent pixel electrode 1260 and a slit group 1280 of the transparent common electrode 1220. Accordingly, the array substrate 1100 includes a plurality of the transparent pixel electrodes 1260 respectively provided in the plurality of pixels 1240, and a plurality of the slit groups 1280 respectively provided in the plurality of pixels 1240. The transparent pixel electrode 1260 provided in each of the plurality of pixels 1240 is disposed above the insulating substrate 1160, and disposed in the display area 1140. The slit group 1280 includes three slits. The slit group 1280 including three slits may be replaced with a slit group including two or less or four or more slits.

The array substrate 1100 further includes a plurality of dummy pixels 1300. The plurality of dummy pixels 1300 do not contribute to the display of an image and are disposed outside the display area 1140. Each of the plurality of dummy pixels 1300 includes the transparent pixel electrode 1260, and the slit group 1280 of the transparent common electrode 1220, as with each of the plurality of pixels 1240. The transparent pixel electrode 1260 provided in each of the plurality of dummy pixels 1300 is disposed above the insulating substrate 1160 outside the display area 1140.

The plurality of contact parts 1168 are provided in the plurality of dummy pixels 1300. This causes the plurality of second gate lines 1166 to be electrically connected to the plurality of first gate lines 1162 in the plurality of dummy pixels 1300 respectively.

In the first preferred embodiment, the plurality of second gate lines 1166 are caused to overlap the plurality of source lines 1164 that neither transmit light nor overlap the slit group 1280. Accordingly, even when the plurality of second gate lines 1166 are disposed in the display area 1140, it is not necessary to reduce the number of slits constituting the slit group 1280, and the plurality of second gate lines 1166 are prevented from causing a decrease in light transmittance and a decrease in display performance.

1.6 Cross-Sectional Structure of Array Substrate

Figure 4:
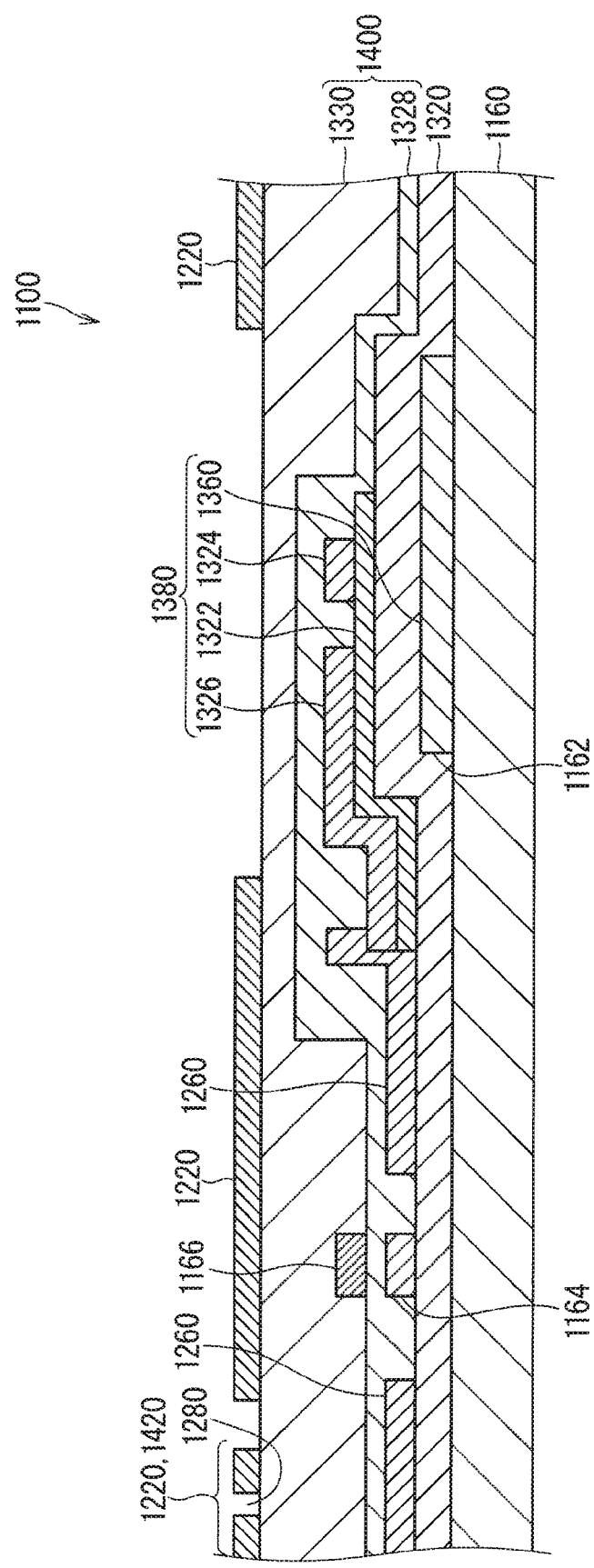
FIG. 4 is an enlarged cross-sectional view schematically illustrating the array substrate provided in the liquid crystal display panel of the first to fifth preferred embodiments.

FIG. 4 is an enlarged cross-sectional view schematically illustrating the array substrate provided in the liquid crystal display panel of the first preferred embodiment FIG. 4 illustrates a cross section taken along a cutting line A-A of FIG. 3.

The array substrate 1100 includes, as illustrated in FIG. 4, the insulating substrate 1160, the first gate line 1162, the source line 1164, the second gate line 1166, the transparent pixel electrode 1260, and the transparent common electrode 1220 described above, and further includes a gate insulating film 1320, a channel layer 1322, a source electrode 1324, a drain electrode 1326, a first interlayer insulating film 1328, and a second interlayer insulating film 1330. The first gate line 1162 includes a counter part 1360. The channel layer 1322, the counter part 1360, the source electrode 1324, and the drain electrode 1326 constitute a TFT 1380. The array substrate 1100 may include components other than these components. A switching element constituted by the TFT 1380 may be replaced with a switching element of a different type.

The insulating substrate 1160 has an insulating property and a light transmitting property, and is made of a glass substrate, a quartz substrate, or the like.

The first gate line 1162, the gate insulating film 1320, the channel layer 1322, the source line 1164, the source electrode 1324, the drain electrode 1326, the transparent pixel electrode 1260, the first interlayer insulating film 1328, the second gate line 1166, the second interlayer insulating film 1330, and the transparent common electrode 1220 are disposed above the insulating substrate 1160. Therefore, the TFT 1380 including the channel layer 1322, the counter part 1360, the source electrode 1324, and the drain electrode 1326 is also disposed above the insulating substrate 1160.

The first gate line 1162 is disposed above the insulating substrate 1160.

The gate insulating film 1320 is disposed above the insulating substrate 1160 so as to overlap the first gate line 1162. The gate insulating film 1320 separates, in the thickness direction of the insulating substrate 1160, the first gate line 1162 from the channel layer 1322, the source electrode 1324, and the drain electrode 1326 that are disposed above the gate insulating film 1320 to electrically insulate the first gate line 1162 from the channel layer 1322, the source electrode 1324, and the drain electrode 1326.

The channel layer 1322 is disposed above the gate insulating film 1320. The channel layer 1322 is disposed above the counter part 1360 with the gate insulating film 1320 interposed therebetween, and faces the counter part 1360 with the gate insulating film 1320 interposed therebetween. This causes the counter part 1360 to function as a gate electrode of the TFT 1380. The gate signal transmitted through the first gate line 1162 is supplied to the counter part 1360.

The source line 1164 is disposed above the gate insulating film 1320.

The source electrode 1324 branches off from the source line 1164 and is disposed over the gate insulating film 1320 and the channel layer 1322. The source signal transmitted through the source line 1164 is supplied to the source electrode 1324.

The drain electrode 1326 is disposed over the gate insulating film 1320 and the channel layer 1322.

The TFT 1380 switches the source signal supplied to the source electrode 1324 in accordance with the gate signal supplied to the counter part 1360 to produce a pixel potential, and supplies the pixel potential thus produced to the drain electrode 1326. Further, the TFT 1380 is disposed along each of the plurality of intersections 1200. Therefore, the array substrate 1100 includes a plurality of the TFTs 1380 respectively disposed along the plurality of intersections 1200. The plurality of TFTs 1380 respectively switch source signals transmitted through source lines 1164 forming the plurality of intersections 1200 in accordance with gate signals transmitted through gate lines 1162 forming the plurality of intersections 1200 to respectively produce a plurality of the pixel potentials.

The transparent pixel electrode 1260 is disposed above the gate insulating film 1320. The transparent pixel electrode 1260 is in contact with the drain electrode 1326. This causes the transparent pixel electrode 1260 to be electrically connected to the drain electrode 1326 and accordingly electrically connected to the TFT 1380. Further, the plurality of pixel potentials thus produced are respectively applied to the plurality of transparent pixel electrodes 1260, The plurality of transparent pixel electrodes 1260 are arranged in a matrix.

The first interlayer insulating film 1328 is disposed above the gate insulating film 1320 so as to overlap the source line 1164, the channel layer 1322, the source electrode 1324, the drain electrode 1326, and the transparent pixel electrode 1260. The first interlayer insulating film 1328 separates, in the thickness direction of the insulating substrate 1160, the source line 1164 from the second gate line 1166 disposed above the first interlayer insulating film 1328 to electrically insulate the source line 1164 from the second gate line 1166.

The second gate line 1166 is disposed above the first interlayer insulating film 1328. The second gate line 1166 is disposed between the source line 1164 and the transparent common electrode 1220.

The second interlayer insulating film 1330 is disposed above the first interlayer insulating film 1328 so as to overlap the second gate line 1166. The second interlayer insulating film 1330 separates, in the thickness direction of the insulating substrate 1160, the second gate line 1166 from the transparent common electrode 1220 disposed above the second interlayer insulating film 1330 to electrically insulate the second gate line 1166 from the transparent common electrode 1220. Further, an insulating film 1400 including the first interlayer insulating film 1328 and the second interlayer insulating film 1330 separates, in the thickness direction of the insulating substrate 1160, the transparent pixel electrode 1260 from the transparent common electrode 1220 disposed above the insulating film 1400 to electrically insulate the transparent pixel electrode 1260 from the transparent common electrode 1220.

The transparent common electrode 1220 is disposed above the second interlayer insulating film 1330. A common potential is applied to the transparent common electrode 1220. The transparent common electrode 1220 includes a counter part 1420. The counter part 1420 has the slit group 1280 and faces the transparent pixel electrode 1260 with the insulating film 1400 interposed therebetween. This causes the transparent common electrode 1220 to produce fringe electric fields in response to the plurality of pixel potentials respectively between the plurality of transparent pixel electrodes 1260 and the transparent common electrode 1220. The fringe electric field thus produced passes through the slit group 1280. Further, a storage capacitance for stabilizing the pixel potential is produced between the transparent pixel electrode 1260 and the transparent common electrode 1220.

1.7 Cross-Sectional Structure of Contact Part

FIG. 5 is an enlarged cross-sectional view schematically illustrating the array substrate and the counter substrate provided in the liquid crystal display panel of the first preferred embodiment. FIG. 5 illustrates a cross section taken along a cutting line B-B of FIG. 3.

In the array substrate 1100, as illustrated in FIG. 5, a first insulating film 1460 including the gate insulating film 1320, the first interlayer insulating film 1328, and the second interlayer insulating film 1330 is disposed between the plurality of first gate lines 1162 and the transparent common electrode 1220. Further, a second insulating film 1462 including the second interlayer insulating film 1330 is disposed between the plurality of second gate lines 1166 and the transparent common electrode 1220.

An insulating film 1480 including the gate insulating film 1320 and the first interlayer insulating film 1328 separates the plurality of second gate lines 1166 from the plurality of first gate lines 1162 in the thickness direction of the insulating substrate 1160. This causes the plurality of second gate lines 1166 to be disposed in a layer different from a layer where the plurality of first gate lines 1162 are disposed and thus causes the plurality of second gate lines 1166 to be disposed at positions different from positions where the plurality of first gate lines 1162 are disposed in the thickness direction of the insulating substrate 1160.

The array substrate 1100 further includes a plurality of first contact hole parts 1500 and a plurality of second contact hole parts 1502.

The plurality of first contact hole parts 1500 pass through the first insulating film 1460. Upper ends of the plurality of first contact hole parts 1500 are in contact with the transparent common electrode 1220. Lower ends of the plurality of first contact hole parts 1500 are respectively in contact with the plurality of first gate lines 1162. This causes the plurality of first gate lines 1162 to be electrically connected to the transparent common electrode 1220 through the plurality of first contact hole parts 1500 respectively.

The plurality of second contact hole parts 1502 pass through the second insulating film 1462. Upper ends of the plurality of second contact hole parts 1502 are in contact with the transparent common electrode 1220. Lower ends of the plurality of second contact hole parts 1502 are respectively in contact with the plurality of second gate lines 1166. This causes the plurality of second gate lines 1166 to be electrically connected to the transparent common electrode 1220 through the plurality of second contact hole parts 1502 respectively.

Accordingly, the plurality of second gate lines 1166 are respectively connected to the plurality of first gate lines 1162 through the plurality of second contact hole parts 1502, the transparent common electrode 1220, and the plurality of first contact hole parts 1500.

The plurality of first contact hole parts 1500 and the plurality of second contact hole parts 1502 are provided in the plurality of dummy pixels 1300 disposed outside the display area 1140. Accordingly, a pixel prone to point defect failure is the dummy pixel 1300 disposed outside the display area 1140. This makes it possible to suppress point defect failure in the display area 1140 and provide the liquid crystal display panel 1020 having high display quality.

The counter substrate 1104 includes a black matrix 1520.

The plurality of first contact hole parts 1500 and the plurality of second contact hole parts 1502 overlap the black matrix 1520 in plan view in the thickness direction of the insulating substrate 1160. Accordingly, the plurality of second gate lines 1166 are electrically connected to the plurality of first gate lines 1162 at positions where the second gate lines 1166 overlap the black matrix 1520 in plan view in the thickness direction of the insulating substrate 1160 respectively. This causes a pixel prone to point defect failure to be shielded by the black matrix 1520 and accordingly prevents the pixel from being visually recognized. This makes it possible to suppress visual recognition of point defect failure and provide the liquid crystal display panel 1020 having high display quality.

1.8 Manufacturing Method of Array Substrate

Hereinafter, a manufacturing method of the array substrate 1100 will be described. The array substrate 1100 may be manufactured by a manufacturing method different from the manufacturing method described below.

First, a first metal film is formed on the insulating substrate 1160. The first metal film is formed by sputtering using a direct current (DC) magnetron. The first metal film may be a metal film composed of Mo, Cr, W, Al, or Ta, or an alloy film made of an alloy primarily composed of Mo, Cr, W, Al, or Ta. Further, pattering is performed on the first metal film thus formed to form the first gate line 1162.

After the first gate line 1162 is formed, the gate insulating film 1320 is formed. The gate insulating film 1320 is formed by plasma-enhanced chemical vapor deposition (CVD). The gate insulating film 1320 is generally a silicon nitride film, but may be a silicon oxide film, a silicon oxynitride film, or the like.

After the gate insulating film 1320 is formed, an amorphous silicon (a-Si) film is formed. The a-Si film is formed by plasma CVD. The a-Si film is generally a laminated film including an intrinsic semiconductor layer and an impurity semiconductor layer containing phosphorus or the like. The intrinsic semiconductor layer constitutes the channel layer 1322. The impurity semiconductor layer is provided to establish an ohmic contact with the source electrode 1324 and the drain electrode 1326. Further, patterning is performed on the a-Si film thus formed to form the channel layer 1322 arranged like islands. The channel layer 1322 may be an oxide semiconductor such as In—Ga—Zn—O instead of a-Si or the like.

After the channel layer 1322 is formed, a second metal film is formed. The second metal film is formed by sputtering using a DC magnetron. The second metal film may be a metal film composed of Mo, Cr, W, Al, or Ta, or an alloy film made of an alloy primarily composed of Mo, Cr, W, Al, or Ta. Further, patterning is performed on the second metal film thus formed to form the source line 1164, the source electrode 1324, and the drain electrode 1326. An impurity semiconductor layer may be etched with the source line 1164, the source electrode 1324, and the drain electrode 1326 serving as masks. This makes it possible to reduce the number of mask processes.

After the source line 1164, the source electrode 1324, and the drain electrode 1326 are formed, a first transparent conductive film is formed. The first transparent conductive film is formed by sputtering using a DC magnetron. The first transparent conductive film is composed of indium tin oxide (ITO), zinc tin oxide (ZTO), or the like. Further, patterning is performed on the first transparent conductive film to form the transparent pixel electrode 1260.

After the transparent pixel electrode 1260 is formed, the first interlayer insulating film 1328 is formed. The first interlayer insulating film 1328 is formed by plasma CVD. The first interlayer insulating film 1328 is a silicon nitride film, a silicon oxide film, a silicon oxynitride film, or the like. The first interlayer insulating film 1328 may be an organic resin film made of an acrylic resin or an imide resin. The organic resin film results from applying a fluid to form a coated film and curing the coated film thus formed. In a case where the first interlayer insulating film 1328 is such an organic resin film, it is possible to increase the thickness of the first interlayer insulating film 1328 with ease and accordingly secure the insulating property of the first interlayer insulating film 1328 with ease. The first interlayer insulating film 1328 may be a laminated film including an inorganic film such as a silicon nitride film, a silicon oxide film, or a silicon oxynitride film, and an organic resin film.

After the first interlayer insulating film 1328 is formed, a third metal film is formed. The third metal film is formed by sputtering using a DC magnetron. The third metal film may be a metal film composed of Mo, Cr, W, Al, or Ta, or an alloy film made of an alloy primarily composed of Mo, Cr, W, Al, or Ta. Further, patterning is performed on the third metal film thus formed to form the second gate line 1166.

After the second gate line 1166 is formed, the second interlayer insulating film 1330 is formed. The second interlayer insulating film 1330 is formed by plasma CVD. The second interlayer insulating film 1330 is a silicon nitride film, a silicon oxide film, a silicon oxynitride film, or the like. The second interlayer insulating film 1330 may be an organic resin film made of an acrylic resin or an imide resin. The organic resin film results from applying a fluid to form a coated film and curing the coated film thus formed. In a case where the second interlayer insulating film 1330 is such an organic resin film, it is possible to increase the thickness of the second interlayer insulating film 1330 with ease and accordingly secure the insulating property of the second interlayer insulating film 1330 with ease. The second interlayer insulating film 1330 may be a laminated film including an inorganic film such as a silicon nitride film, a silicon oxide film, or a silicon oxynitride film, and an organic resin film.

After the second interlayer insulating film 1330 is formed, a first contact hole extending from an upper surface of the second interlayer insulating film 1330 to the first gate line 1162 is formed, and a second contact hole extending from the upper surface of the second interlayer insulating film 1330 to the second gate line 1166 is formed.

After the first contact hole and the second contact hole are formed, a second transparent conductive film is formed. The second transparent conductive film is formed by sputtering using a DC magnetron. The second transparent conductive film is made of ITO, ZTO, or the like. Further, patterning is performed on the second transparent conductive film to form the transparent common electrode 1220. When the second transparent conductive film is formed, a transparent conductive film is attached to inner surfaces of the first contact hole and the second contact hole to form the first contact hole part 1500 and the second contact hole part 1502. When patterning is performed on the second transparent conductive film, the slit group 1280 is formed on the transparent pixel electrode 1260.

1.9 Comparison with Reference Example

Figure 16:
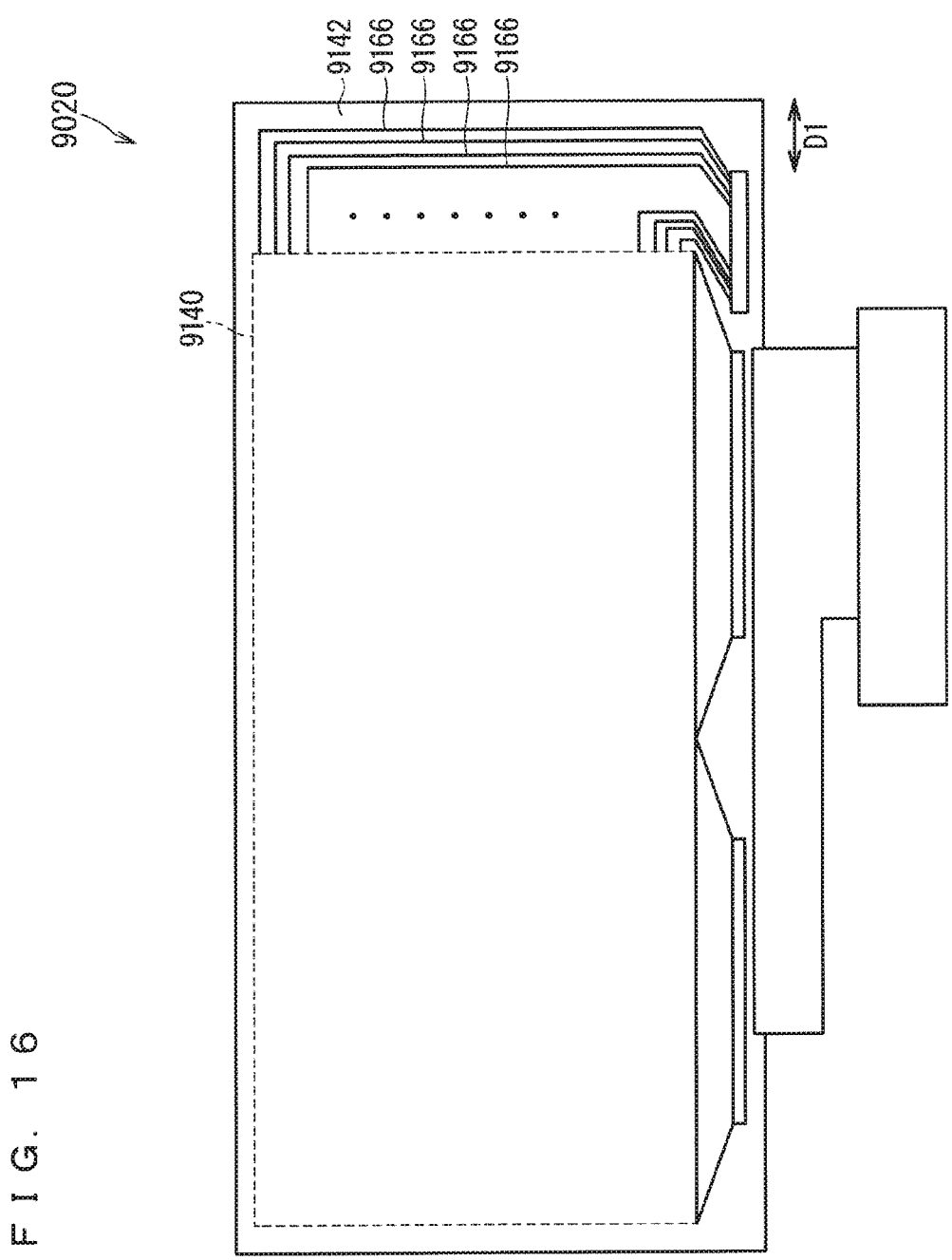
FIG. 16 is a plan view schematically illustrating the liquid crystal display panel of the reference example.

FIG. 16 is a plan view schematically illustrating a liquid crystal display panel of a reference example.

In a liquid crystal display panel 9020 illustrated in FIG. 16, main portions of a plurality of second gate lines 9166 are disposed outside a display area 9140 and on one side in the first direction D1 when viewed from the display area 9140. In this configuration, as illustrated in FIG. 16, it is not possible to narrow a frame area 9142 defined along one of four sides surrounding the display area 9140 located on one side in the first direction D1. Comparison between FIG. 16 and FIG. 2 can lead to understanding of the reason why the frame area 1142 defined along three of the four sides surrounding the display area 1140 can be narrowed in the first preferred embodiment.

2 Second Preferred Embodiment

The second preferred embodiment is different from the first preferred embodiment mainly in the following point: in the first preferred embodiment, the plurality of second gate lines 1166 are electrically connected to the plurality of first gate lines 1162 through the plurality of second contact hole parts 1502, the transparent common electrode 1220, and the plurality of first contact hole parts 1500 respectively. On the other hand, in the second preferred embodiment, the plurality of second gate lines 1166 are electrically connected to the plurality f first gate lines 1162 only through a plurality of contact hole parts described below respectively.

Hereinafter, a configuration of a liquid crystal display panel of the second preferred embodiment related to the above difference will be described. With respect to a configuration of which no description will be given, the configuration employed for the liquid crystal display panel 1020 of the first preferred embodiment is employed for the liquid crystal display panel of the second preferred embodiment as it is or with modifications.

FIG. 1 also serves as a cross-sectional view schematically illustrating the liquid crystal display device including the liquid crystal display panel of the second preferred embodiment. FIG. 2 also serves as a plan view schematically illustrating the liquid crystal display panel of the second preferred embodiment. FIG. 4 also serves as an enlarged cross-sectional view schematically illustrating an array substrate provided in the liquid crystal display panel of the second preferred embodiment.

Figure 6:
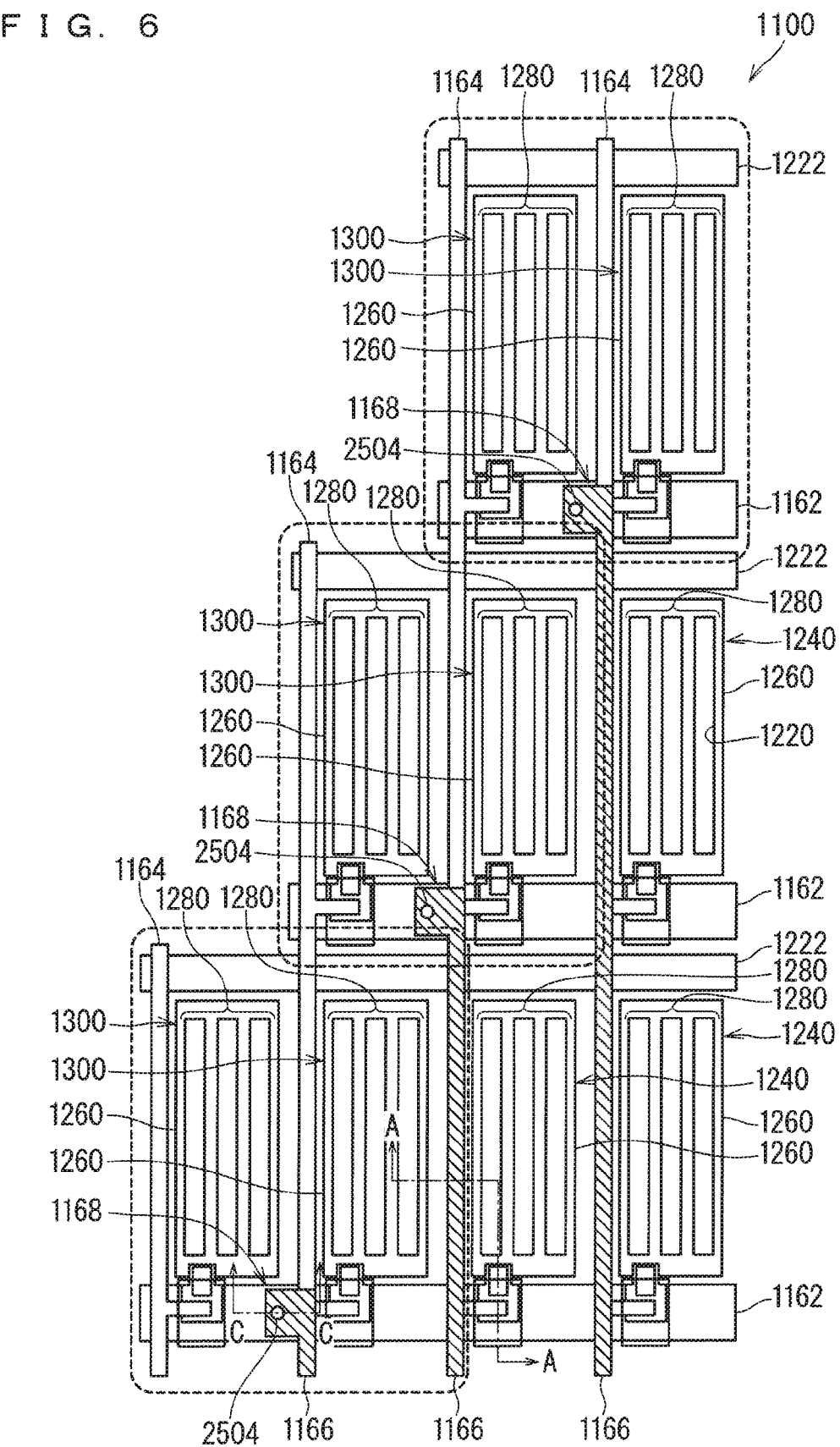
FIG. 6 is an enlarged plan view schematically illustrating a pattern on the array substrate provided in the liquid crystal display panel of the second preferred embodiment.

FIG. 6 is an enlarged plan view schematically illustrating a pattern on the array substrate provided in the liquid crystal display panel of the second preferred embodiment FIG. 6 is an enlarged view of a pattern located in the region R1 illustrated in FIG. 2.

Figure 7:
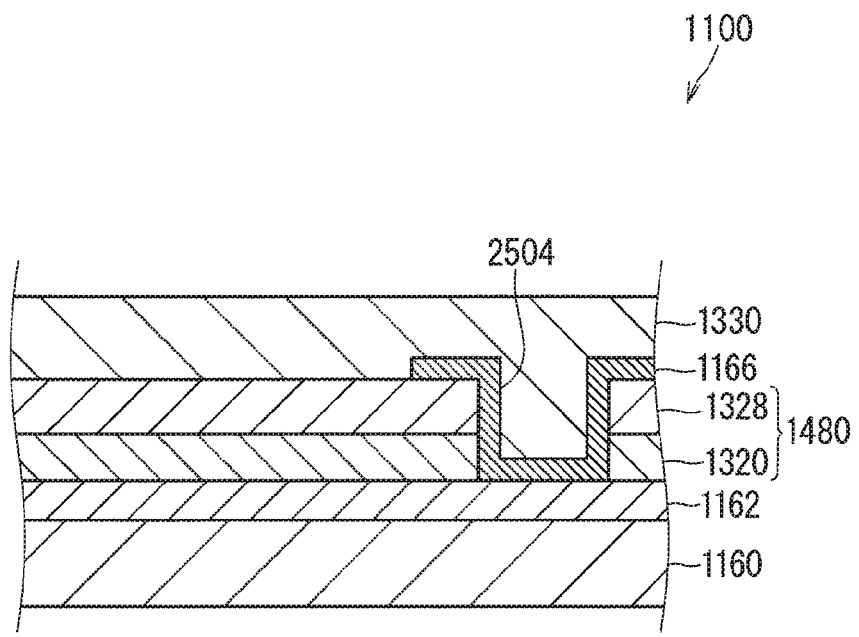
FIG. 7 is an enlarged cross-sectional view schematically illustrating the array substrate provided in the liquid crystal display panel of the second preferred embodiment.

FIG. 7 is an enlarged cross-sectional view schematically illustrating the array substrate provided in the liquid crystal display panel of the second preferred embodiment. FIG. 7 illustrates a cross section taken along a cutting line C-C of FIG. 6.

In a liquid crystal display panel 2020 of the second preferred embodiment, as illustrated in FIG. 7, the insulating film 1480 including the gate insulating film 1320 and the first interlayer insulating film 1328 is disposed between the plurality of first gate lines 1162 and the plurality of second gate lines 1166.

The array substrate 1100 includes a plurality of contact hole parts 2504 as illustrated in FIGS. 6 and 7.

The plurality of contact hole parts 2504 pass through the insulating film 1480. Upper ends of the plurality of contact hole parts 2504 are respectively in contact with the plurality of second gate lines 1166. Lower ends of the plurality of contact hole parts 2504 are respectively in contact with the plurality of first gate lines 1162. This causes the plurality of second gate lines 1166 to be electrically connected to the plurality of first gate lines 1162 through the plurality of second contact hole parts 2504 respectively.

The plurality of contact hole parts 2504 are provided in the plurality of dummy pixels 1300 disposed outside the display area 1140.

In the second preferred embodiment, the frame area 1142 defined along three of the four sides surrounding the display area 1140 can be narrowed, as in the first preferred embodiment. It is also possible to suppress display abnormality and point defect failure. It is also possible to easily design the liquid crystal display panel 2020 having a peculiar planar shape and high design characteristics. Further, the plurality of second gate lines 1166 are prevented from causing a decrease in display performance.

In the first preferred embodiment, the transparent co on electrode 1220 to which the plurality of gate signals are applied is in close proximity to the liquid crystal layer 1102. Accordingly, in the vicinity of the transparent common electrode 1220 to which the plurality of gate signals are applied, the orientations of the liquid crystal molecules vary, which may deteriorate the display quality due to, for example, light leakage. On the other hand, in the second preferred embodiment, the second interlayer insulating film 1330 separates the plurality of second gate lines 1166 to which the plurality of gate signals are applied from the liquid crystal layer 1102. This makes it possible to provide the liquid crystal display panel 2020 having high display quality.

3 Third Preferred Embodiment

The third preferred embodiment is different from the first preferred embodiment mainly in the following point: in the first preferred embodiment, the plurality of second gate lines 1166 are electrically connected to the plurality of first gate lines 1162 outside the display area 1140 respectively. On the other hand, in the third preferred embodiment, the plurality of second gate lines 1166 are electrically connected to the plurality of first gate lines 1162 in the display area 1140 respectively. Further, a plurality of conductive layers described below are respectively disposed between the plurality of source lines 1164 and the plurality of second gate lines 1166, and a potential identical to the common potential or a ground potential is applied to the plurality of conductive layers thus disposed.

Hereinafter, a configuration of a liquid crystal display panel of the third preferred embodiment related to the above difference will be described. With respect to a configuration of which no description be given, the configuration employed for the liquid crystal display panel 1020 of the first preferred embodiment is employed for the liquid crystal display panel of the third preferred embodiment as it is or with modifications.

FIG. 1 also serves as a cross-sectional view schematically illustrating the liquid crystal display device including the liquid crystal display panel of the third preferred embodiment. FIG. 4 also serves as an enlarged cross-sectional view schematically, illustrating an array substrate provided in the liquid crystal display panel of the third preferred embodiment. FIG. 5 also serves an enlarged cross-sectional view schematically illustrating the array substrate and a counter substrate provided in the liquid crystal display panel of the third preferred embodiment.

Figure 8:
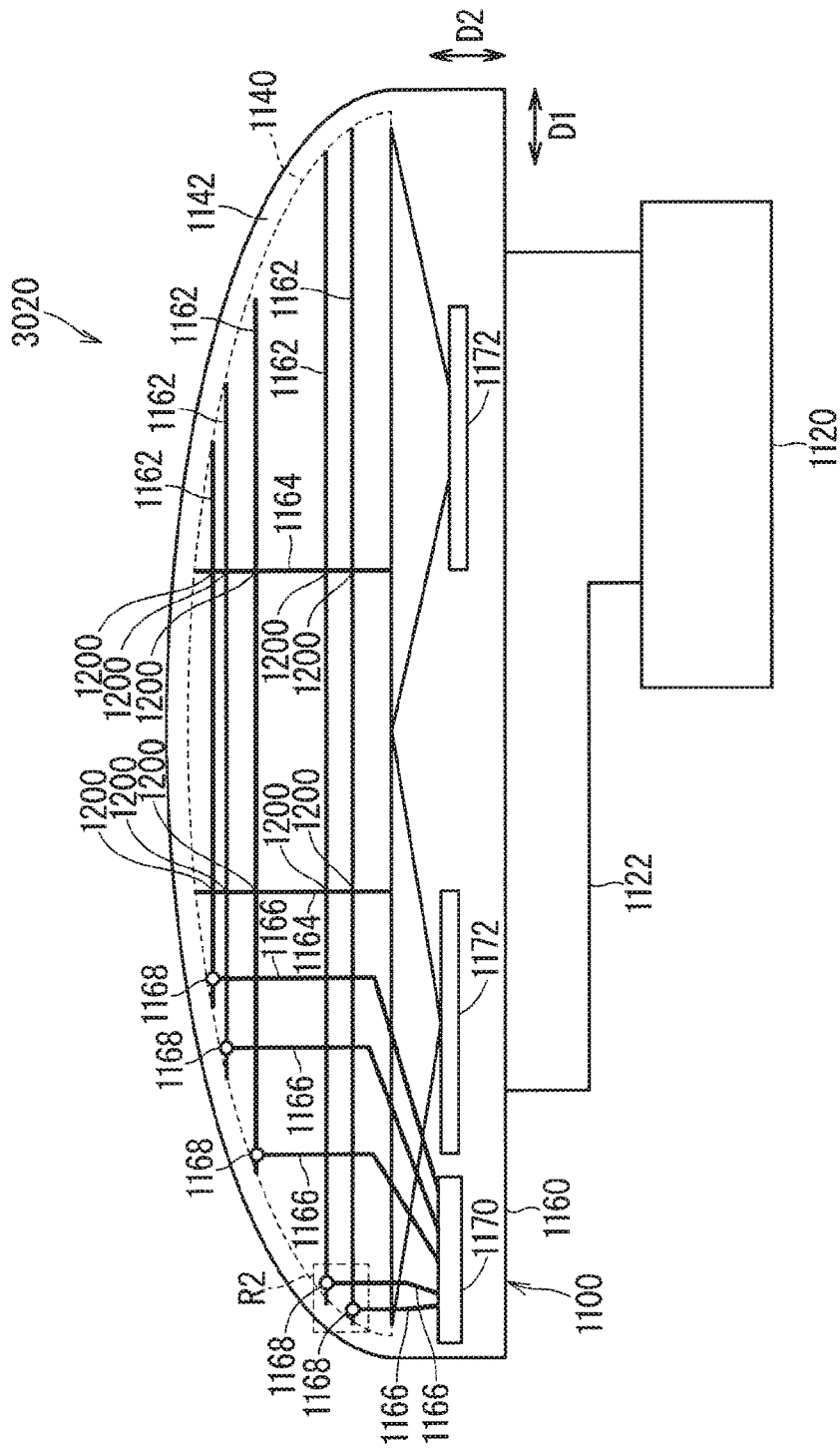
FIG. 8 is a plan view schematically illustrating the liquid crystal display panel of the third preferred embodiment.

FIG. 8 is a plan view schematically illustrating the liquid crystal display panel of the third preferred embodiment.

Figure 9:
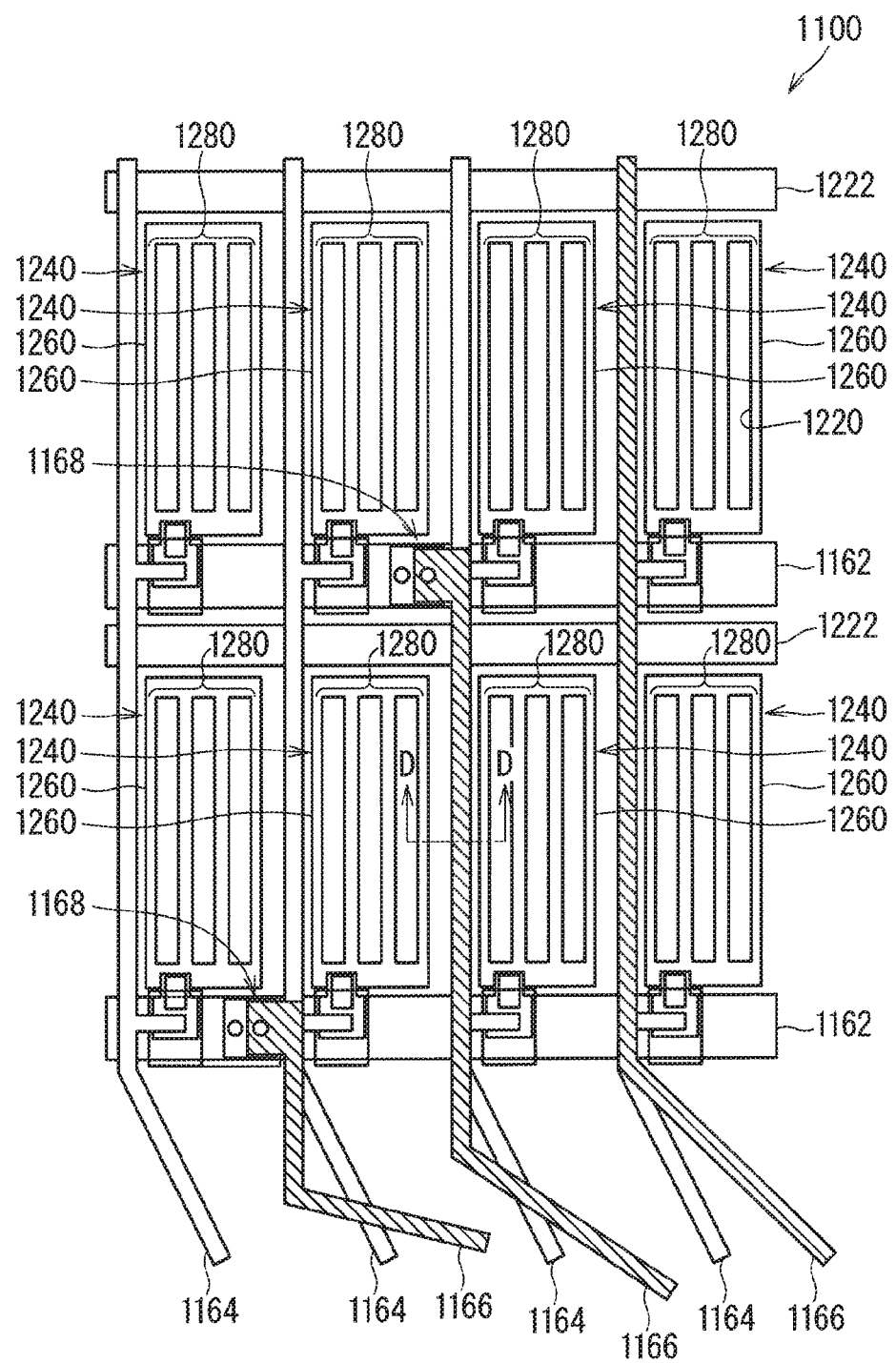
FIG. 9 is an enlarged plan view schematically illustrating a pattern on the array substrate provided in the liquid crystal display panel of the third preferred embodiment.

FIG. 9 is an enlarged plan view schematically illustrating a pattern on the array substrate provided in the liquid crystal display panel of the third preferred embodiment. FIG. 9 is an enlarged view of a pattern located in a region R2 illustrated in FIG. 8.

Figure 10:
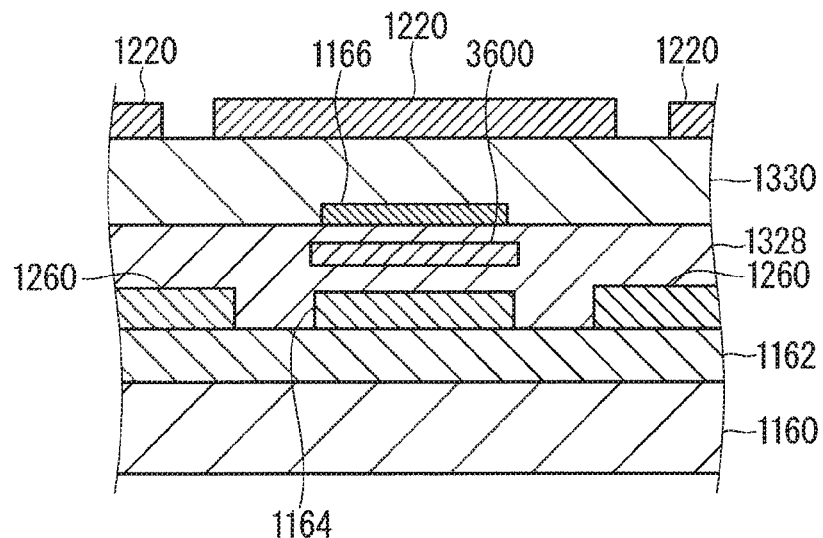
FIG. 10 is an enlarged cross-sectional view schematically illustrating the array substrate provided in the liquid crystal display panel of the third preferred embodiment.

FIG. 10 is an enlarged cross-sectional view schematically illustrating the array substrate provided in the liquid crystal display panel of the third preferred embodiment. FIG. 10 illustrates a cross section taken along a cutting line D-D of FIG. 9.

In a liquid crystal display panel 3020 of the third preferred embodiment, as illustrated in FIGS. 8 and 9, the plurality of second gate lines 1166 are electrically connected to the plurality of first gate lines 1162 through the plurality of contact parts 1168 respectively. The plurality of contact parts 1168 are disposed in the display area 1140. This causes the plurality of second gate lines 1166 to be electrically connected to the plurality of first gate lines 1162 in the display area 1140 respectively.

The plurality of contact parts 1168 are provided in the plurality of pixels 1240. This causes the plurality of second gate lines 1166 to be electrically connected to the plurality of first gate lines 1162 in the plurality of pixels 1240 respectively.

The array substrate 1100 includes a plurality of conductive layers 3600 as illustrated in FIG. 10.

The plurality of conductive layers 3600 are respectively disposed between the plurality of source lines 1164 and the plurality of second gate lines 1166. A potential identical to the common potential or a ground potential is applied to the plurality of conductive layers 3600. The plurality of conductive layers 3600 are embedded in the first interlayer insulating film 1328, and the first interlayer insulating film 1328 separates the plurality of conductive layers 3600 from the plurality of source lines 1164 and the plurality of second gate lines 1166 in the thickness direction of the insulating substrate 1160 to electrically insulate the plurality of conductive layers 3600 from the plurality of source lines 1164 and the plurality of second gate lines 1166.

The ground potential is desirably applied to the plurality of conductive layers 3600. Further, the plurality of second gate lines 1166 are disposed in a layer identical to a layer where the plurality of transparent pixel electrodes 1260 are disposed.

In the third preferred embodiment, the frame area 1142 defined along three of the four sides surrounding the display area 1140 can be narrowed, as in the first preferred embodiment. It is also possible to easily design the liquid crystal display panel 3020 having a peculiar planar shape and high design characteristics. Further, the plurality of second gate lines 1166 are prevented from causing a decrease in display performance.

Further, in the third preferred embodiment, a stray capacitance produced between the source line 1164 and the second gate line 1166 is reduced, making it possible to suppress the influence of the gate signal on the source signal. This in turn makes it possible to suppress display abnormality.

In addition, in the third preferred embodiment, even when the second gate line 1166 is electrically connected to the first gate line 1162 in the display area 1140, display abnormality can be suppressed. This makes it possible to further narrow the frame area 1142.

4 Fourth Preferred Embodiment

The fourth preferred embodiment is different from the first preferred embodiment mainly in the following point: in the first preferred embodiment, one second gate line 1166 overlaps one source line 1164. On the other hand, in the fourth preferred embodiment, two second gate lines 1166 overlap one source line 1164.

Hereinafter, a configuration of a liquid crystal display panel of the fourth preferred embodiment related to the above difference will be described. With respect to a configuration of which no description will be given, the configuration employed for the liquid crystal display panel 1020 of the first preferred embodiment is employed for the liquid crystal display panel of the fourth preferred embodiment as it is or with modifications.

FIG. 1 also serves as a cross-sectional view schematically illustrating the liquid crystal display device including the liquid crystal display panel of the fourth preferred embodiment. FIG. 2 also serves as a plan view schematically illustrating the liquid crystal display panel of the fourth preferred embodiment. FIG. 4 also serves as an enlarged cross-sectional view schematically illustrating an array substrate provided in the liquid crystal display panel of the fourth preferred embodiment. FIG. 5 also serves an enlarged cross-sectional view schematically illustrating the array substrate and a counter substrate provided in the liquid crystal display panel of the fourth preferred embodiment.

Figure 11:
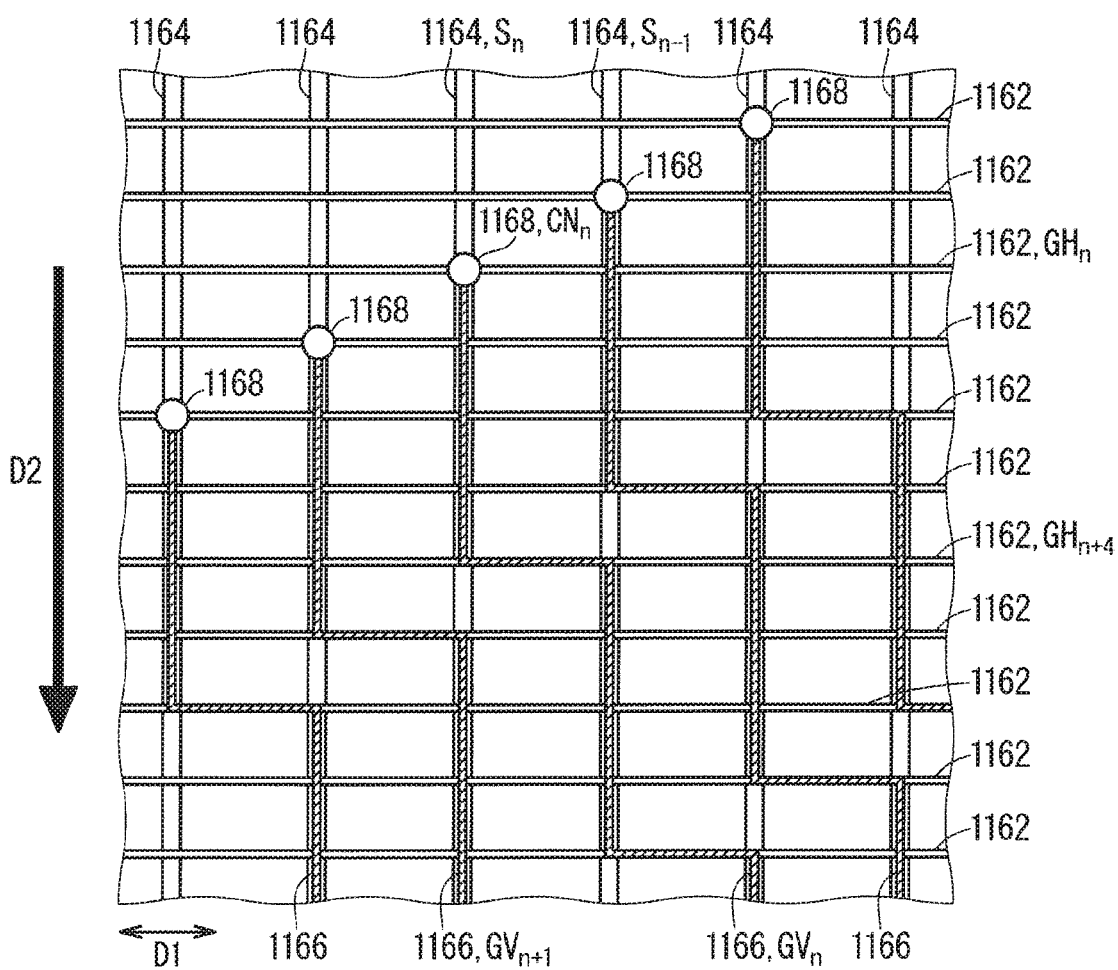
FIG. 11 is a plan view schematically illustrating an arrangement of a plurality of first gate lines, a plurality of source lines, a plurality of second gate lines, and a plurality of contact parts provided in the liquid crystal display panel of the fourth preferred embodiment.

FIG. 11 is a plan view schematically illustrating an arrangement of a plurality of first gate lines, a plurality of source lines, a plurality of second gate lines, and a plurality of contact parts provided in the liquid crystal display panel of the fourth preferred embodiment.

In a liquid crystal display panel 4020 of the fourth preferred embodiment, as illustrated in FIG. 11, the plurality of first gate lines 1162 are arranged in the second direction D2, and the second direction D2 corresponds to a gate signal scan direction.

An n-th second gate line $GV_n$ of the plurality of second gate lines 1166 is electrically connected to an n-th first gate line $GH_n$ of the plurality of first gate lines 1162 through an n-th contact part $CN_n$ of the plurality of contact parts 1168. n is a natural number. The n-th contact part $CN_n$ is disposed outside the display area 1140, but may be disposed in the display area 1140.

The n-th second gate line $GV_n$ extends, in the display area 1140, over an n-th source line $S_n$ of the plurality of source lines 1164 in the second direction D2, extends over an (n+4)-th first gate line $GH_{n+4}$ in the first direction D1, and then extends over an (n−1)-th source line $S_{n−1}$ in the second direction D2. Accordingly, the plurality of second gate lines 1166 have an arrangement where two second gates lines 1166 overlap each of the plurality of source lines 1164 in the display area 1140 in plan view in the thickness direction of the insulating substrate 1160.

The n-th second gate line $GV_n$ extends over the n-th source line $S_n$ by a distance four times a pixel pitch in the second direction D2, extends over the (n+4)-th first gate line $G_{n+4}$ by a distance equal to the pixel pitch in the first direction D1, and then extends over the (n−1)-th source line $S_{n−1}$ by a distance four times the pixel pitch in the second direction D2. The distance four times the pixel pitch in the second direction D2 may be changed to a different distance. However, the different distance is a distance expressed by a natural number multiple of the pixel pitch in the second direction D2. The distance equal to the pixel pitch in the first direction D1 may be changed to a different distance. However, the different distance is a distance expressed by a natural number multiple of the pixel pitch in the first direction D1.

Figure 12:
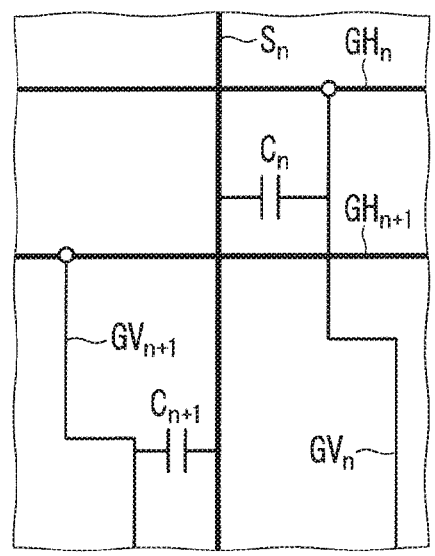
FIG. 12 is a simplified circuit diagram simply illustrating electrical connections among the plurality of first gate lines, the plurality of source lines, the plurality of second gate lines, and the plurality of contact parts provided in the liquid crystal display panel of the fourth preferred embodiment.

FIG. 12 is a simplified circuit diagram simply illustrating electrical connections among the plurality of first gate lines, the plurality of source lines, the plurality of second gate lines, and the plurality of contact parts provided in the liquid crystal display panel of the fourth preferred embodiment.

In the following, on the assumption that the n-th source line $S_n$ is selected, the n-th first gate line $GH_n$ is referred to as a present-stage gate line, the (n−1)-th first gate line $GH_{n+1}$ that is scanned after the n-th first gate line $GH_n$ is referred to as a next-stage gate line, and the n-th source line $S_n$ is referred to as a selected source line.

As illustrated in FIG. 11, the second gate line $GV_n$ electrically connected to the present-stage gate line $GH_n$ and the second gate line $GV_{n+1}$ electrically connected to the next-stage gate line $GH_{n+1}$ are disposed over the selected source line $S_n$. This causes, as illustrated in FIG. 12, the selected source line $S_n$ to be capacitively coupled to the second gate line $GV_n$ and the second gate line $GV_{n+1}$. Accordingly, the selected source line $S_n$ produces a stray capacitance $C_n$ with the second gate line $GV_n$, and produces a stray capacitance $C_{n+1}$ with the second gate line $GV_{n+1}$. The stray capacitance $C_n$ is smaller than a stray capacitance produced when the selected source line $S_n$ is capacitively coupled to only the second gate line $GV_n$. The stray capacitance $C_{n+1}$ is desirably equal to the stray capacitance $C_n$.

Figure 13:
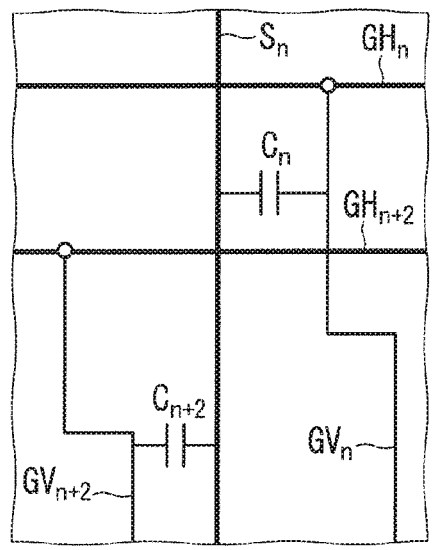
FIG. 13 is a simplified circuit diagram simply illustrating electrical connections among the plurality of first gate lines, the plurality of source lines, the plurality of second gate lines, and the plurality of contact parts provided in a liquid crystal display panel of a modification of the fourth preferred embodiment.

FIG. 13 is a simplified circuit diagram simply illustrating electrical connections among the plurality of first gate lines, the plurality of source lines, the plurality of second gate lines, and the plurality of contact parts provided in a liquid crystal display panel of a modification of the fourth preferred embodiment.

In the following, on the assumption that the n-th source line $S_n$ is selected, the n-th first gate line $GH_n$ is referred to as a present-stage gate line, the (n+2)-th gate line $CH_{n+2}$ that is scanned second after the n-th first gate line $GH_n$ is referred to as a second-next-stage gate line, and the n-th source line $S_n$ is referred to as a selected source line.

In the modification, over the selected source line $S_n$, the second gate line $GV_n$ electrically connected to the present-stage gate line $GH_n$ and the second gate line $GV_{n+2}$ electrically connected to the second-next-stage gate line $GH_{n+2}$ are disposed. This causes the selected source line $S_n$ to be capacitively coupled to the second gate line $GV_n$ and the second gate line $GV_{n+2}$. Accordingly, as illustrated in FIG. 13, the selected source line $S_n$ produces a stray capacitance $C_n$ with the second gate line $GV_n$, and produces a stray capacitance $C_{n+2}$ with the second gate line $GV_{n+2}$. The stray capacitance $C_n$ is smaller than a stray capacitance produced when the selected source line $S_n$ is capacitively coupled to only the second gate line $GV_n$. The stray capacitance $C_{n+2}$ is desirably equal to the stray capacitance $C_n$.

Instead of the arrangement where two second gate lines 1166 overlap each of the plurality of source lines 1164, an arrangement where three or more second gate lines 1166 overlap each of the plurality of source lines 1164 may be employed.

In the fourth preferred embodiment, the frame area 1142 defined along three of the four sides surrounding the display area 1140 can be narrowed, as in the first preferred embodiment. It is also possible to suppress display abnormality and point defect failure. It is also possible to easily design the liquid crystal display panel 4020 having a peculiar planar shape and high design characteristics. Further, the plurality of second gate lines 1166 are prevented from causing a decrease in display performance.

Further, in the fourth preferred embodiment, two or more second gate lines 1166 are capacitively coupled to one source line 1164 to make the stray capacitance produced between one second gate line 1166 and one source line 1164 small, making it possible to suppress the influence of the gate signal on the source signal. This in turn makes it possible to suppress display abnormality.

5 Fifth Preferred Embodiment

The fifth preferred embodiment is different from the first preferred embodiment mainly in the following point: in the first preferred embodiment, transition of the plurality of gate signals from an on potential to an off potential is made in one stage. On the other hand, in the fifth preferred embodiment, the transition of the plurality of gate signals from the on potential to the off potential is made in two stages.

Hereinafter, a configuration of a liquid crystal display panel of the fifth preferred embodiment related to the above difference will be described. With respect to a configuration of which no description will be given, the configuration employed for the liquid crystal display panel 1020 of the first preferred embodiment is employed for the liquid crystal display panel of the fifth preferred embodiment as it is or with modifications.

FIG. 1 also serves as a cross-sectional view schematically illustrating the liquid crystal display device including the liquid crystal display panel of the fifth preferred embodiment. FIG. 2 also serves as a plan view schematically illustrating the liquid crystal display panel of the fifth preferred embodiment. FIG. 3 is an enlarged plan view schematically illustrating a pattern on an array substrate provided in the liquid crystal display panel of the fifth preferred embodiment. FIG. 4 also serves as an enlarged cross-sectional view schematically illustrating the array substrate provided in the liquid crystal display panel of the fifth preferred embodiment. FIG. 5 also serves as an enlarged cross-sectional view schematically illustrating the array substrate and a counter substrate provided in the liquid crystal display panel of the fifth preferred embodiment.

Figure 14A:
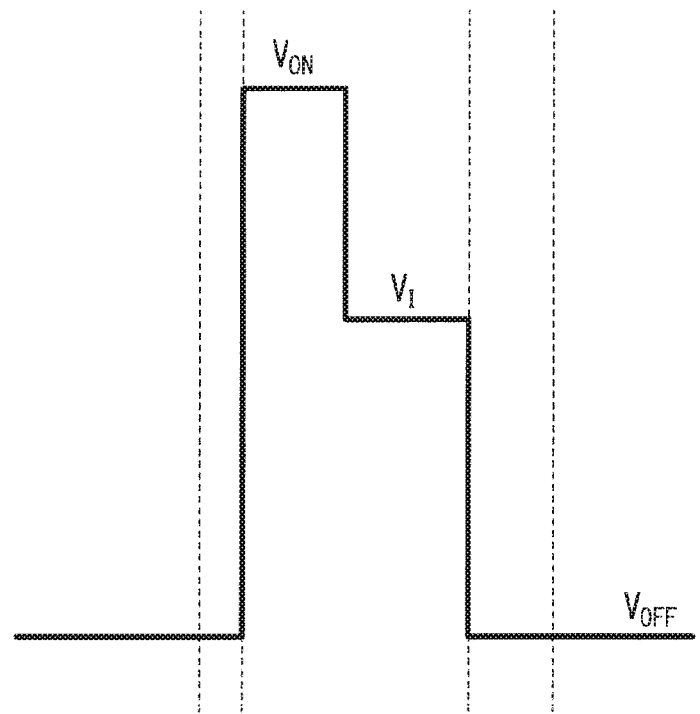
FIGS. 14A and 14B are simplified waveform charts showing waveforms of a gate signal and a source signal in the liquid crystal display panel of the fifth preferred embodiment.
Figure 14B:
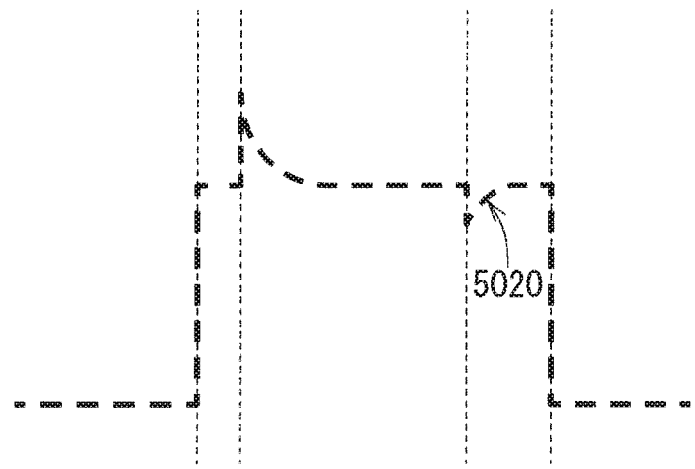

FIGS. 14A and 14B are simplified waveform charts showing waveforms of the gate signal and the source signal in the liquid crystal display panel of the fifth preferred embodiment. FIG. 14A shows time variations in potential of the gate signal. FIG. 14B shows time variations in potential of the source signal. In FIGS. 14A and 14B, the axis of ordinates represents the potential, and the axis of abscissas represents the time.

Figure 15A:
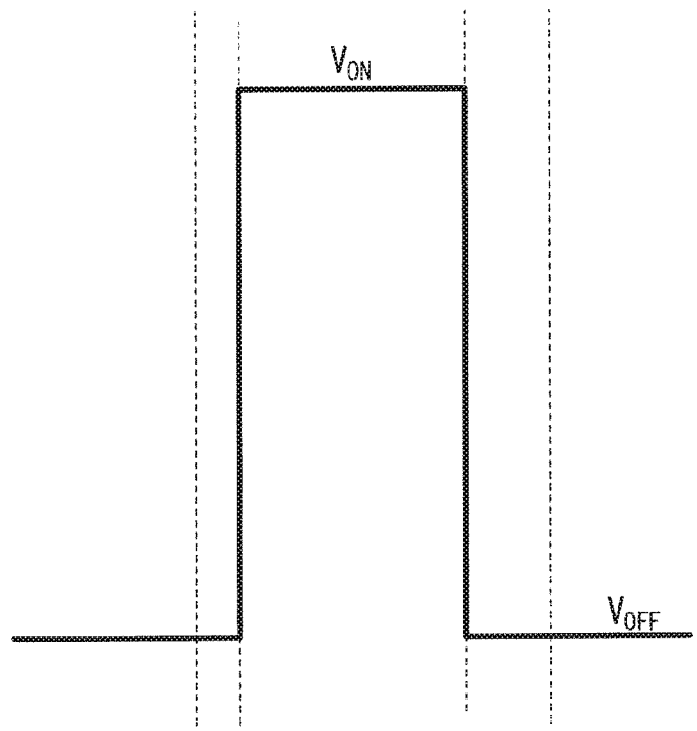
FIGS. 15A and 15B are simplified waveform charts showing waveforms of a gate signal and a source signal in a liquid crystal display panel of a reference example.
Figure 15B:
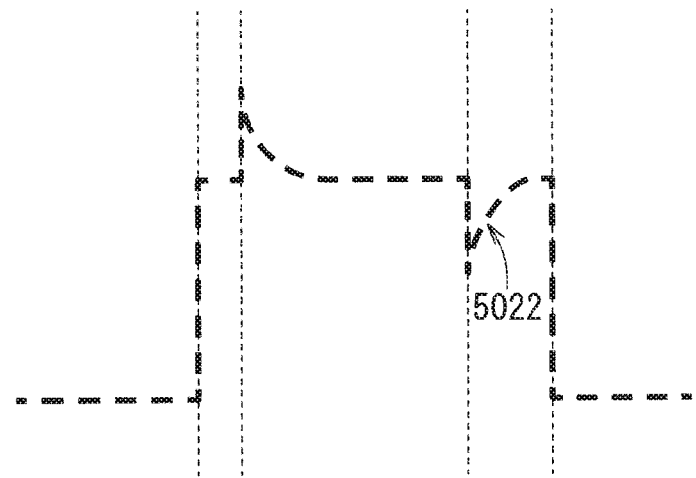

FIGS. 15A and 15B are simplified waveform charts showing waveforms of the gate signal and the source signal in the liquid crystal display panel of the reference example. FIG. 15A shows time variations in potential of the gate signal. FIG. 15B shows time variations in potential of the source signal. In FIGS. 15A and 15B, the axis of ordinates represents the potential, and the axis of abscissas represents the time.

In a liquid crystal display panel 5020 of the fifth preferred embodiment, the plurality of second gate lines 1166 are electrically connected to the plurality of first gate lines 1162 outside the display area 1140 respectively, but may be electrically connected to the plurality of first gate lines 1162 in the display area 1140 respectively.

In the liquid crystal display panel 5020 of the fifth preferred embodiment, as illustrated in FIG. 14A, when the gate signal is made low, the transition of the potential of the gate signal from an on potential $V_{ON}$ to an off potential $V_{OFF}$ is made in two stages including a first stage in which the potential of the gate signal is lowered from the on potential $V_{ON}$ to an intermediate potential. $V_1$, and a second stage in which the potential of the gate signal is lowered from the intermediate potential $V_1$ to the off potential $V_{OFF}$. In a period from the end of the first stage to the start of the second stage, the potential of the gate signal is maintained at the intermediate potential $V_1$ for a set time. The transition of the potential of the gate signal from the on potential $V_{ON}$ to the off potential $V_{OFF}$ may be made in three or more stages. As described above, when the transition of the potential of the gate signal from the on potential $V_{ON}$ to the off potential $V_{OFF}$ is made in two or more stages, the transition of the potential of the gate signal from the on potential $V_{ON}$ to the off potential $V_{OFF}$ is made slowly, making it possible to suppress an influence 5020 of the gate signal on the source signal due to the capacitive coupling, as illustrated in FIG. 14B. This in turn makes it possible to suppress display abnormality.

On the other hand, as illustrated in FIG. 15A, when the transition of the potential of the gate signal from the on potential $V_{ON}$ to the off potential $V_{OFF}$ is made in one stage, an influence 5022 of the gate signal on the source signal due to the capacitive coupling becomes larger.

In the fifth preferred embodiment, the frame area 1142 defined along three of the four sides surrounding the display area 1140 can be narrowed, as in the first preferred embodiment. It is also possible to suppress display abnormality and point defect failure. It is also possible to easily design the liquid crystal display panel 5020 having a peculiar planar shape and high design characteristics. Further, the plurality of second gate lines 1166 are prevented from causing a decrease in display performance.

Note that, according to the present invention, each of the preferred embodiments can be modified or omitted as appropriate within the scope of the present invention.

Although descriptions have been given of the examples in which the color filter is formed on the counter substrate 1104 of the first to fifth preferred embodiments, the color filter may be formed on the array substrate 1100.

Although descriptions have been given of the configuration in which the common electrode 1220 is formed on the array substrate 1100, the common electrode 1220 may be formed on the counter substrate 1104 like a TN type. In such a configuration, display is performed by producing electric fields in response to the plurality of pixel potentials in the liquid crystal layer 1102 between the plurality of transparent pixel electrodes and the common electrode.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display panel comprising:
an array substrate;
a liquid crystal layer; and
a counter substrate facing the array substrate with the liquid crystal layer interposed between the array substrate and the counter substrate, wherein
the array substrate includes
 an insulating substrate,
 a plurality of first gate lines disposed above the insulating substrate, extending in a first direction parallel to the insulating substrate in a display area where an image is displayed, and respectively transmitting a plurality of gate signals,
 a plurality of source lines disposed above the insulating substrate, extending in a second direction that is parallel to the insulating substrate and orthogonal to the first direction in the display area, forming a plurality of intersections with the plurality of first gate lines in plan view in a thickness direction of the insulating substrate, and respectively transmitting a plurality of source signals,
 a plurality of switching elements disposed above the insulating substrate, and respectively switching source signals transmitted through source lines that form the plurality of intersections in accordance with gate signals transmitted through gate lines that form the plurality of intersections to respectively produce a plurality of pixel potentials,
 a plurality of transparent pixel electrodes disposed above the insulating substrate, and disposed in the display area, the plurality of pixel potentials being applied to the plurality of transparent pixel electrodes respectively,
 a plurality of second gate lines disposed above the insulating substrate, extending in the second direction in the display area, disposed at positions different from positions where the plurality of first gate lines are disposed in the thickness direction of the insulating substrate, electrically connected to the plurality of first gate lines outside the display area respectively, and respectively transmitting the plurality of gate signals to the plurality of first gate lines, and
 a common electrode configured to produce electric fields in response to the plurality of pixel potentials respectively between the plurality of transparent pixel electrodes and the common electrode.

2. The liquid crystal display panel according to claim 1, wherein
the plurality of second gate lines overlap the plurality of source lines in the display area in plan view in the thickness direction of the insulating substrate.

3. The liquid crystal display panel according to claim 1, wherein
the array substrate further includes a plurality of contact parts provided in dummy pixels disposed outside the display area, and
the plurality of second gate lines are electrically connected to the plurality of first gate lines through the plurality of contact parts respectively.

4. The liquid crystal display panel according to claim 1, wherein
the counter substrate includes a black matrix, and
the plurality of second gate lines are electrically connected to the plurality of first gate lines at positions where the plurality of second gate lines overlap the black matrix in plan view in the thickness direction of the insulating substrate.

5. The liquid crystal display panel according to claim 1, wherein
the array substrate further includes
 a first insulating film disposed between the plurality of first gate lines and transparent common electrode,
 a second insulating film disposed between the plurality of second gate lines and the transparent common electrode,
 a plurality of first contact hole parts passing through the first insulating film, and
 a plurality of second contact hole parts passing through the second insulating film,
the plurality of first gate lines are electrically connected to the transparent common electrode through the plurality of first contact hole parts respectively, and
the plurality of second gate lines are electrically connected to the transparent common electrode through the plurality of second contact hole parts respectively.

6. The liquid crystal display panel according to claim 1, wherein
the array substrate further includes
 an insulating film disposed between the plurality of first gate lines and the plurality of second gate lines, and
 a plurality of contact hole parts passing through the insulating film, and
the plurality of second gate lines are electrically connected to the plurality of first gate lines through the plurality of contact hole parts respectively.

7. A liquid crystal display panel comprising:
an array substrate;
a liquid crystal layer; and
a counter substrate facing the array substrate with the liquid crystal layer interposed between the array substrate and the counter substrate, wherein the array substrate includes
an insulating substrate,
a plurality of first gate lines disposed above the insulating substrate, extending in a first direction parallel to the insulating substrate in a display area where an image is displayed, and respectively transmitting a plurality of gate signals,
a plurality of source lines disposed above the insulating substrate, extending in a second direction that is parallel to the insulating substrate and orthogonal to the first direction in the display area, forming a plurality of intersections with the plurality of first gate lines in plan view in a thickness direction of the insulating substrate, and respectively transmitting a plurality of source signals,
a plurality of switching elements disposed above the insulating substrate, respectively switching source signals transmitted through source lines that form the plurality of intersections in accordance with gate signals transmitted through gate lines that form the plurality of intersections to respectively produce a plurality of pixel potentials,
a plurality of transparent pixel electrodes disposed above the insulating substrate, and disposed in the display area, the plurality of pixel potentials being applied to the plurality of transparent pixel electrodes respectively,
a plurality of second gate lines disposed above the insulating substrate, extending in the second direction in the display area, disposed at positions different from positions where the plurality of first gate lines are disposed in the thickness direction of the insulating substrate, electrically connected to the plurality of first gate lines in the display area respectively, and respectively transmitting the plurality of gate signals to the plurality of first gate lines,
a transparent common electrode disposed above the insulating substrate, and producing fringe electric fields in response to the plurality of pixel potentials respectively between the plurality of transparent pixel electrodes and the common electrode, and
a plurality of conductive layers respectively disposed between the plurality of source lines and the plurality of second gate lines, a potential identical to a common potential applied to the transparent common electrode or a ground potential being applied to the plurality of conductive layers.

8. The liquid crystal display panel according to claim 7, wherein
the ground potential is applied to the plurality of conductive layers, and
the plurality of second gate lines are disposed in a layer identical to a layer where the plurality of transparent pixel electrodes are disposed.

9. A liquid crystal display panel comprising:
an array substrate;
a liquid crystal layer; and
a counter substrate facing the array substrate with the liquid crystal layer interposed between the array substrate and the counter substrate, wherein
the array substrate includes
an insulating substrate,
a plurality of first gate lines disposed above the insulating substrate, extending in a first direction parallel to the insulating substrate in a display area where an image is displayed, and respectively transmitting a plurality of gate signals,
a plurality of source lines disposed above the insulating substrate, extending in a second direction that is parallel to the insulating substrate and orthogonal to the first direction in the display area, forming a plurality of intersections with the plurality of first gate lines in plan view in a thickness direction of the insulating substrate, and respectively transmitting a plurality of source signals,
a plurality of switching elements disposed above the insulating substrate, respectively switching source signals transmitted through source lines that form the plurality of intersections in accordance with gate signals transmitted through gate lines that form the plurality of intersections to respectively produce a plurality of pixel potentials,
a plurality of transparent pixel electrodes disposed above the insulating substrate, and disposed in the display area, the plurality of pixel potentials being applied to the plurality of transparent pixel electrodes respectively,
a plurality of second gate lines disposed above the insulating substrate, extending in the second direction in the display area, disposed at positions different from positions where the plurality of first gate lines are disposed in the thickness direction of the insulating substrate, electrically connected to the plurality of first gate lines respectively, respectively transmitting the plurality of gate signals to the plurality of first gate lines, and having an arrangement where two or more second gates lines overlap each of the plurality of source lines in the display area in plan view in the thickness direction of the insulating substrate, and
a common electrode configured to respectively produce electric fields in response to the plurality of pixel potentials between the plurality of transparent pixel electrodes and the common electrode.

10. A liquid crystal display panel comprising:
an array substrate;
a liquid crystal layer; and
a counter substrate facing the array substrate with the liquid crystal layer interposed between the array substrate and the counter substrate, wherein
the array substrate includes
an insulating substrate,
a plurality of first gate lines disposed above the insulating substrate, extending in a first direction parallel to the insulating substrate in a display area where an image is displayed, and respectively transmitting a plurality of gate signals,
a plurality of source lines disposed above the insulating substrate, extending in a second direction that is parallel to the insulating substrate and orthogonal to the first direction in the display area, forming a plurality of intersections with the plurality of first gate lines in plan view in a thickness direction of the insulating substrate, and respectively transmitting a plurality of source signals,
a plurality of switching elements disposed above the insulating substrate, respectively switching source signals transmitted through source lines that form the plurality of intersections in accordance with gate signals transmitted through gate lines that form the plurality of intersections to respectively produce a plurality of pixel potentials,
a plurality of transparent pixel electrodes disposed above the insulating substrate, and disposed in the display area, the plurality of pixel potentials being applied to the plurality of transparent pixel electrodes respectively, a plurality of second gate lines disposed above the insulating substrate, extending in the second direction in the display area, disposed at positions different from positions where the plurality of first gate lines are disposed in the thickness direction of the insulating substrate, electrically connected to the plurality of first gate lines respectively, and respectively transmitting the plurality of gate signals to the plurality of first gate lines, and a gate signal source configured to output the plurality of gate signals and make transition of a potential of each of the plurality of gate signals from an on potential to an off potential via at least one intermediate potential that is between the on potential and the off potential.

* * * * *